US012597213B2

(12) United States Patent
Despande et al.

(10) Patent No.: US 12,597,213 B2
(45) Date of Patent: Apr. 7, 2026

(54) GESTURE BASED TACTILE INTERACTION IN EXTENDED REALITY USING FORM FACTOR OF A PHYSICAL OBJECT

(71) Applicant: Tata Consultancy Services Limited, Mumbai (IN)

(72) Inventors: Lakshmi Despande, Mumbai (IN); Amandeep Othi, Delhi (IN); Ashok Maharaj, Chennai (IN); Jibin John, Chennai (IN); Gowthaman Jayabalakrishnan, Chennai (IN); Jai Kumar, Santa Clara, CA (US); Abhijeet Kumar, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 463 days.

(21) Appl. No.: 18/120,569

(22) Filed: Mar. 13, 2023

(65) Prior Publication Data
US 2023/0298283 A1 Sep. 21, 2023

(30) Foreign Application Priority Data
Mar. 16, 2022 (IN) .............................. 202221014384

(51) Int. Cl.
| | |
|---|---|
| *G06T 19/00* | (2011.01) |
| *G06F 8/36* | (2018.01) |
| *G06F 9/451* | (2018.01) |
| *H04L 67/131* | (2022.01) |

(52) U.S. Cl.
CPC .............. G06T 19/006 (2013.01); G06F 8/36 (2013.01); *G06F 9/451* (2018.02); *H04L 67/131* (2022.05)

(58) Field of Classification Search
CPC ........ G06T 19/006; G06F 3/011; G06F 3/017; G06F 9/451; H04L 37/131
See application file for complete search history.

(56) References Cited

U.S. PATENT DOCUMENTS

| | | | |
|---|---|---|---|
| 9,383,823 B2 | 7/2016 | Geisner et al. | |
| 9,785,247 B1 * | 10/2017 | Horowitz | ............. G06V 40/113 |
| 9,959,463 B2 | 5/2018 | Rafii et al. | |

(Continued)

FOREIGN PATENT DOCUMENTS

JP 2023548795 A * 11/2023 ............. G06F 3/167

*Primary Examiner* — Chante E Harrison
(74) *Attorney, Agent, or Firm* — Finnegan, Henderson, Farabow, Garrett & Dunner, LLP

(57) ABSTRACT

A product is traditionally experienced in XR mainly through sight that accounts for about 80% of sensory inputs, thereby impeding an immersive experience of a product. In the present disclosure, an object's form factor guides a user's gestures in carrying out actions on an augmentation. A suitable physical object marker mimics physical touch interaction with a virtual product. Leveraging the sense of touch, the user gains deeper understanding of the virtual product, since the product responds to the user's natural gestures. In accordance with the present disclosure, transform data in the form of a position, an orientation and a scale associated with the physical object and user's hands handling the physical object are recorded to identify an associated gesture. Utilizing gesture to action mapping, the user's action is translated to the virtual product. The augmentation is modified in real time to provide an immersive experience.

18 Claims, 26 Drawing Sheets

(56)                References Cited

U.S. PATENT DOCUMENTS

| | | | |
|---|---|---|---|
| 10,156,909 B2 | 12/2018 | Kamiya et al. | |
| 10,445,899 B1 | 10/2019 | Dagley et al. | |
| 10,846,899 B2 * | 11/2020 | Pokorny | G06F 3/0304 |
| 2018/0033202 A1 | 2/2018 | Lam et al. | |
| 2019/0026936 A1 * | 1/2019 | Gorur Sheshagiri | |
| | | | G06F 3/0304 |
| 2022/0121275 A1 * | 4/2022 | Balaji | G06T 19/006 |
| 2022/0121276 A1 * | 4/2022 | Saito | G06V 20/20 |
| 2023/0139626 A1 * | 5/2023 | Berliner | G06F 3/1423 |
| | | | 345/156 |
| 2025/0095302 A1 * | 3/2025 | Wetmore | G06F 3/013 |

* cited by examiner

FIG.3B

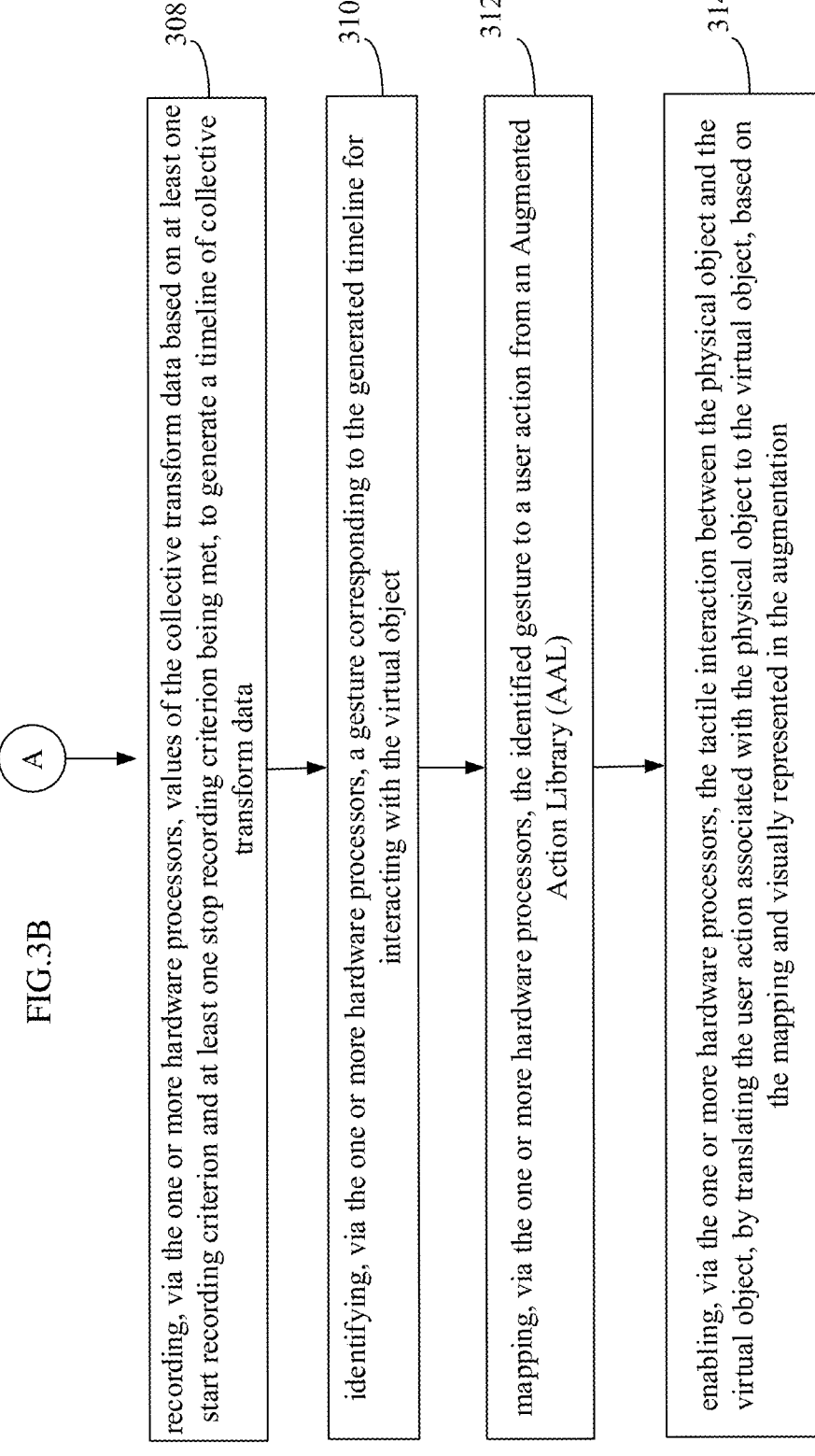

308 recording, via the one or more hardware processors, values of the collective transform data based on at least one start recording criterion and at least one stop recording criterion being met, to generate a timeline of collective transform data 310 identifying, via the one or more hardware processors, a gesture corresponding to the generated timeline for interacting with the virtual object 312 mapping, via the one or more hardware processors, the identified gesture to a user action from an Augmented Action Library (AAL)

314 enabling, via the one or more hardware processors, the tactile interaction between the physical object and the virtual object, by translating the user action associated with the physical object to the virtual object, based on the mapping and visually represented in the augmentation FIG.8B
FIG.8A (prior art)
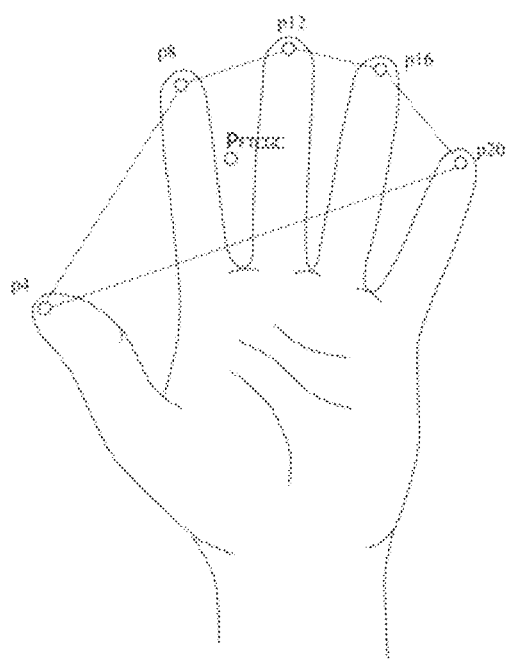
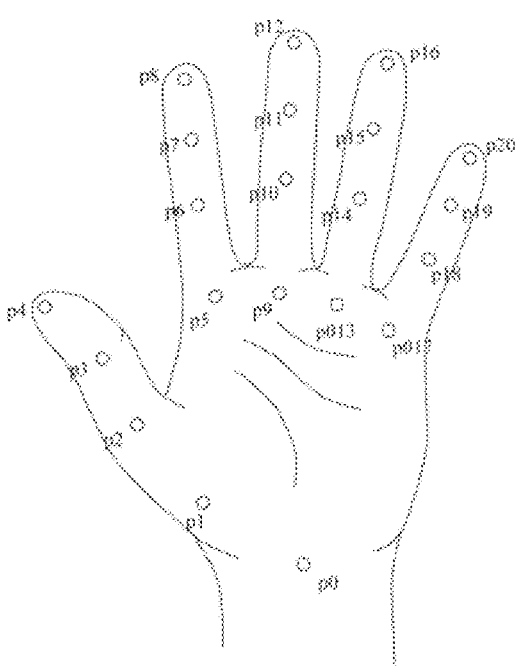

FIG.8D                                                   FIG.8C
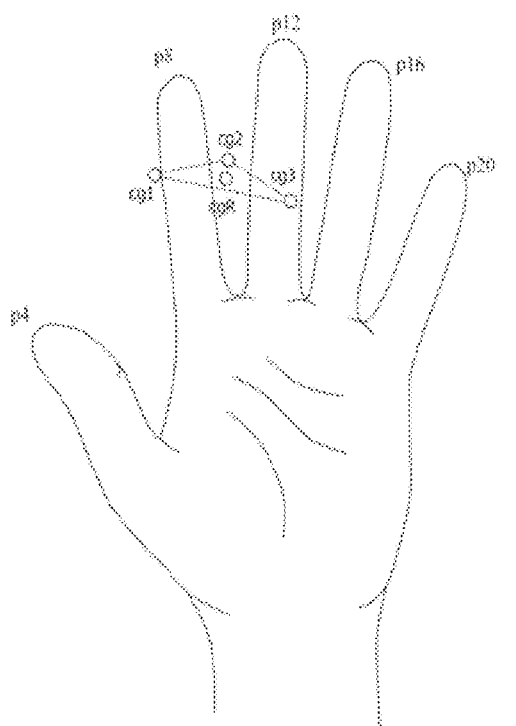
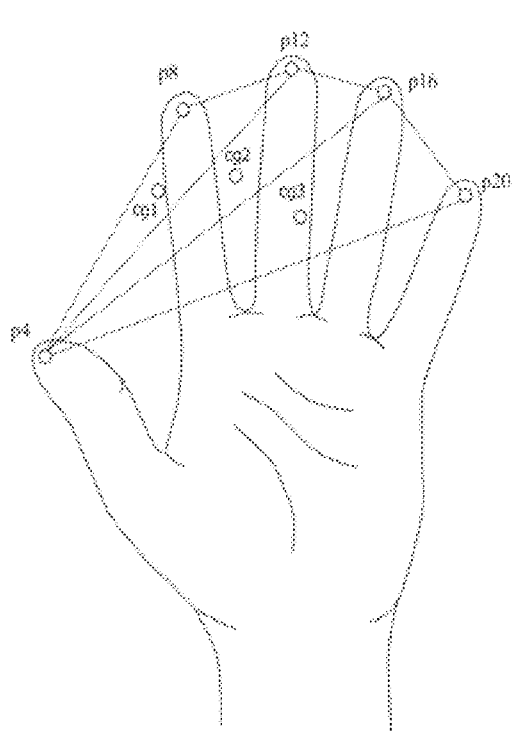

FIG.8F                                              FIG.8E
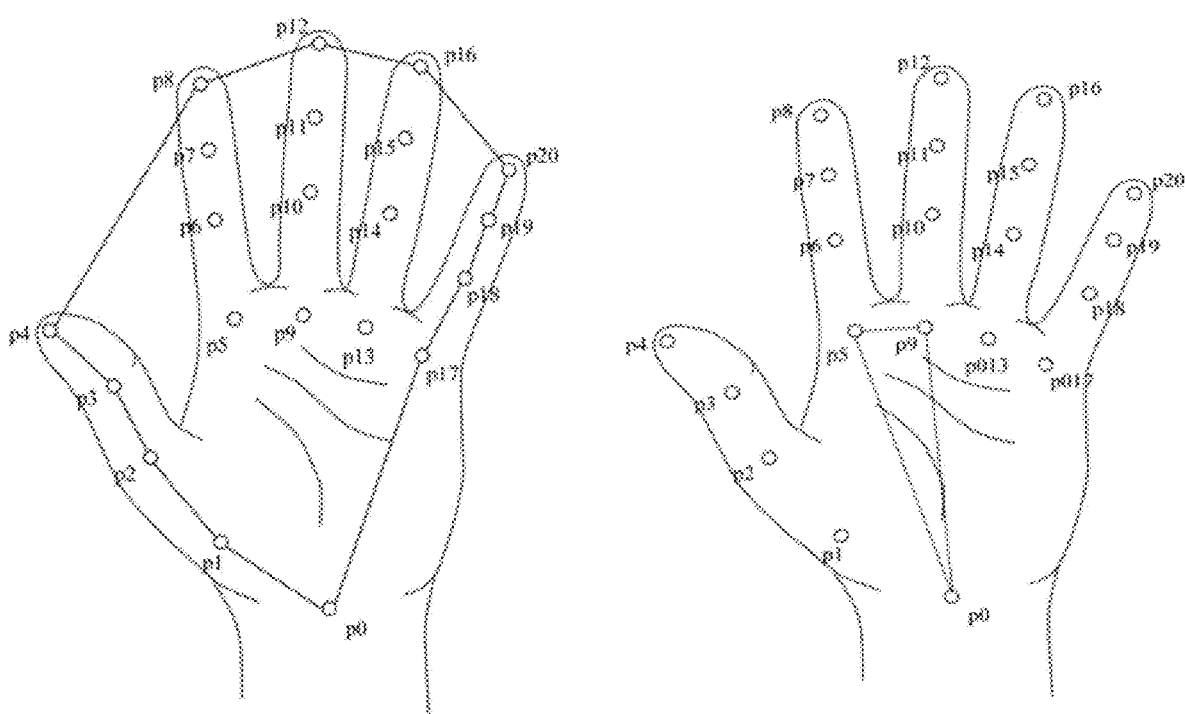

FIG.8J
FIG.8I
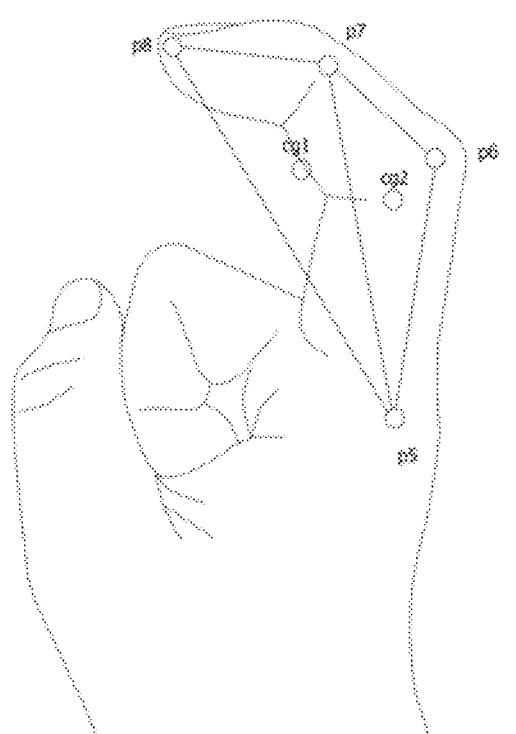
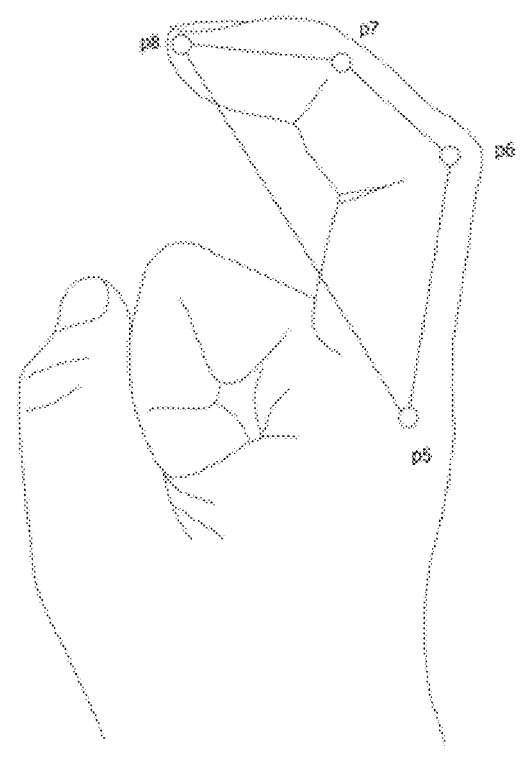

A Handheld visiting card
becomes a mobile phone in AR

A handheld pen
becomes a Torch in AR

A Handheld Ball becomes
a Bluetooth speaker in AR

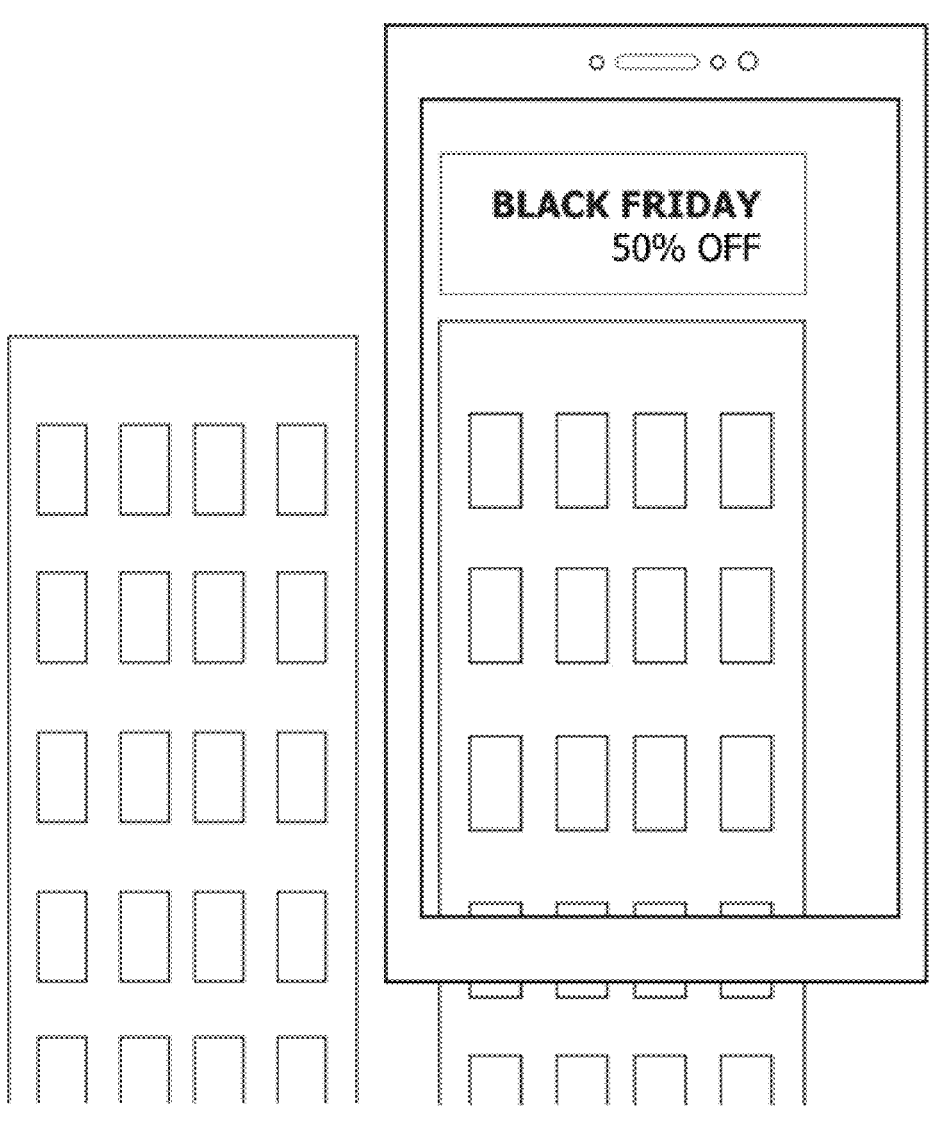
FIG.12A                              FIG.12B

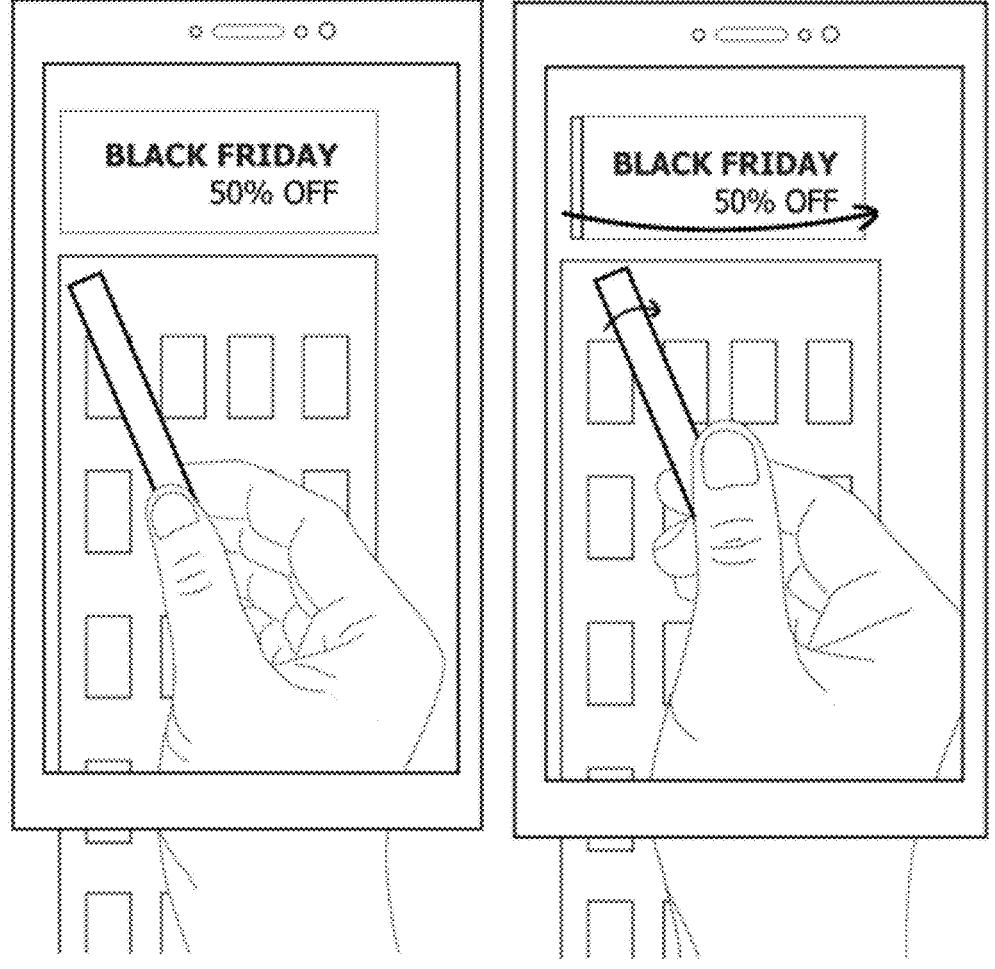
FIG.12C                                    FIG.12D

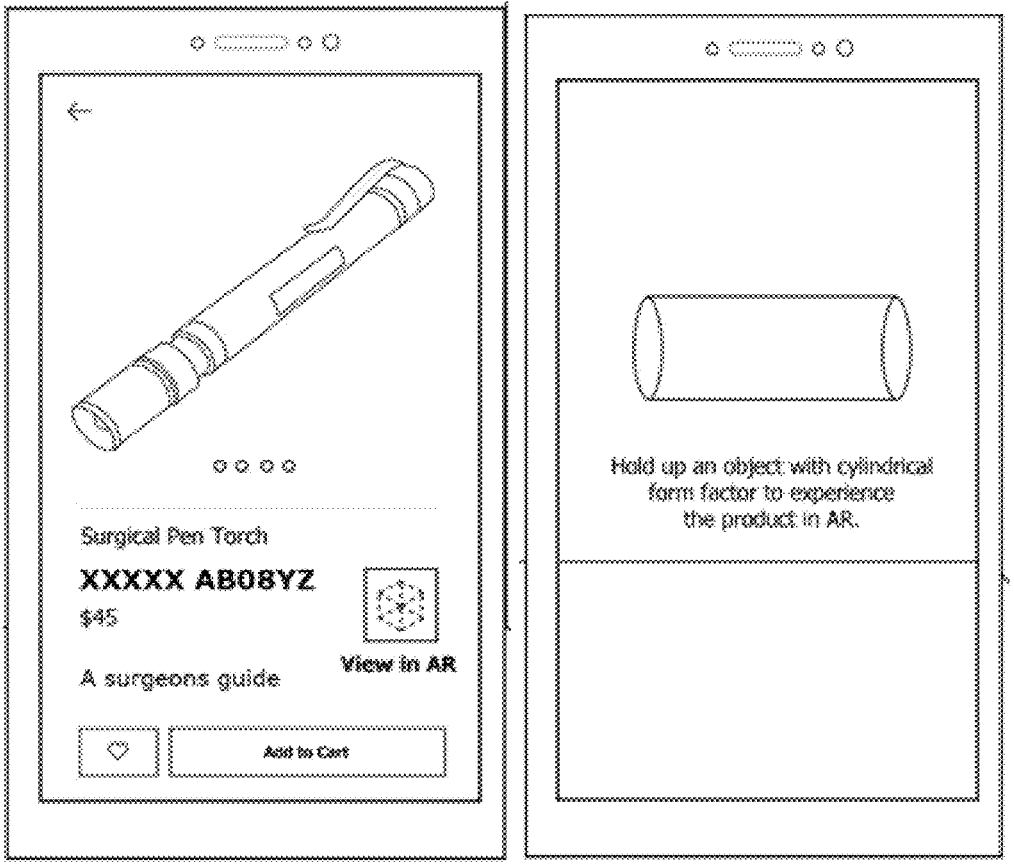
FIG.13A                 FIG.13B

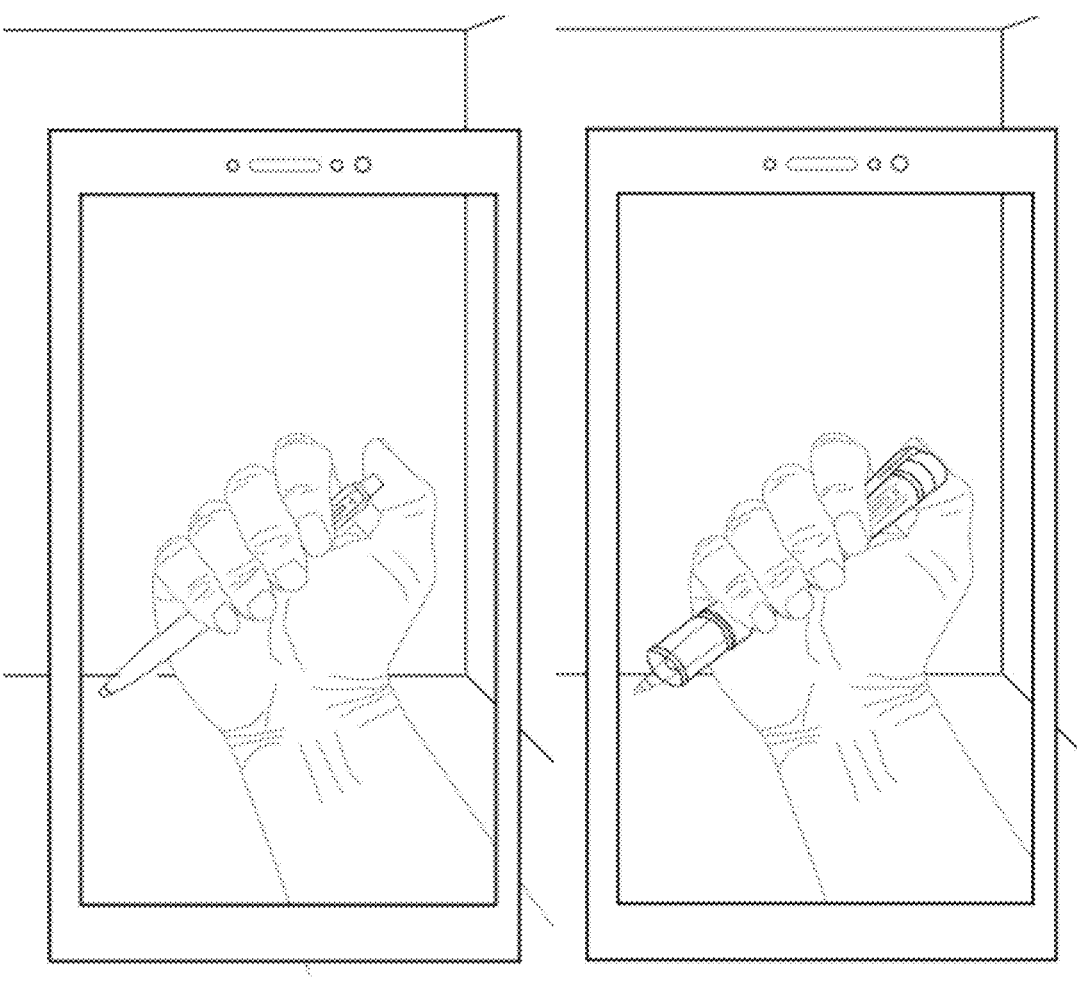
FIG.13C                                FIG.13D

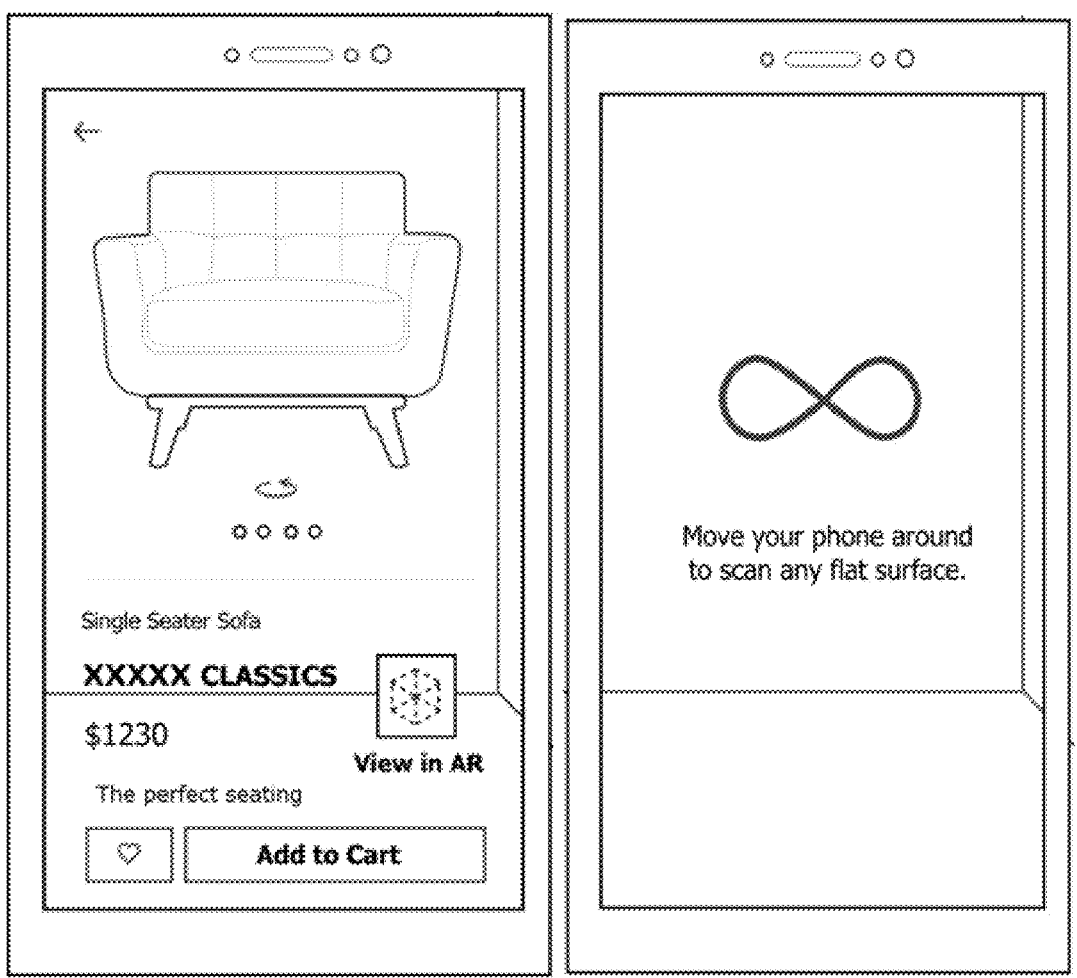
FIG.14A                    FIG.14B

GESTURE BASED TACTILE INTERACTION IN EXTENDED REALITY USING FORM FACTOR OF A PHYSICAL OBJECT

PRIORITY CLAIM

This U.S. patent application claims priority under 35 U.S.C. § 119 to: India Application No. 202221014384, filed on 16 Mar. 2022. The entire contents of the aforementioned application are incorporated herein by reference.

TECHNICAL FIELD

The disclosure herein generally relates to the field of Extended Reality (XR), and, more particularly, to systems and methods for gesture based tactile interaction in XR using form factor of a physical object.

BACKGROUND

Extended Reality (XR) is primarily driven by visuals layers to display information to users. Out of the sensory inputs that a human receives, 80% is visual, while the remaining 20% includes the sense of touch. Currently in XR, there is a disconnect between what a user visualizes in an augmentation and how the user holds a physical object serving as a marker. A product is traditionally experienced in XR through sight and not much through gestural manipulation. Displaying merely visuals of a product is limiting when it comes to fully experiencing a product. This may impede user engagement and consequently a product's full physical understanding.

SUMMARY

Embodiments of the present disclosure present technological improvements as solutions to one or more of the above-mentioned technical problems recognized by the inventors in conventional systems.

In an aspect, there is provided a processor implemented method comprising the steps of: initiating, via a system in communication with a camera and an Extended Reality (XR) setup, a request for an XR viewing of a virtual object using (i) a marker-based approach, wherein the XR setup comprises a corresponding software development kit (SDK) or (ii) a markerless or a location-based approach, wherein the XR setup comprises the corresponding SDK and an object detection SDK; prompting a user, via one or more hardware processors comprised in the system, in response to the request, to hold a physical object in the camera's view and perform a gesture, wherein the physical object having an associated form factor serves as at least one of (i) a marker, and (ii) a controller, coupled to the virtual object for tactile interaction therebetween; obtaining, via the one or more hardware processors, (i) a collective transform data based on generated transform data and (ii) an augmentation from the XR setup using either (a) the marker coupled to the virtual object, (b) by scanning a user's environment by the camera or (c) turning on the camera, wherein the transform data is generated in the form of a position, an orientation and a scale associated with (i) the physical object and (ii) at least one hand of the user handling the physical object, from a continuous video feed from the camera, and when the user performs the prompted gesture; recording, via the one or more hardware processors, values of the collective transform data based on at least one start recording criterion and at least one stop recording criterion being met, to generate a timeline of collective transform data; identifying, via the one or more hardware processors, a gesture corresponding to the generated timeline for interacting with the virtual object; mapping, via the one or more hardware processors, the identified gesture to a user action from an Augmented Action Library (AAL); and enabling, via the one or more hardware processors, the tactile interaction between the physical object and the virtual object, by translating the user action associated with the physical object to the virtual object, based on the mapping and visually represented in the augmentation.

In another aspect, there is provided a system comprising: memory storing instructions; one or more communication interfaces; one or more hardware processors coupled to the memory via the one or more communication interfaces, wherein the one or more hardware processors are configured by the instructions to: initiate a request for an Extended Reality (XR) viewing of a virtual object via a camera and an XR setup by using (i) a marker-based approach, wherein the XR setup comprises a corresponding software development kit (SDK) or (ii) a markerless or a location-based approach, wherein the XR setup comprises the corresponding SDK and an object detection SDK: prompt a user, in response to the request, to hold a physical object in the camera's view and perform a gesture, wherein the physical object having an associated form factor serves as at least one of (i) a marker, and (ii) a controller, coupled to the virtual object for tactile interaction therebetween; obtain (i) a collective transform data based on generated transform data and (ii) an augmentation from the XR setup using either (a) the marker coupled to the virtual object, (b) by scanning a user's environment by the camera or (c) turning on the camera, wherein the transform data is generated in the form of a position, an orientation and a scale associated with (i) the physical object and (ii) at least one hand of the user handling the physical object, from a continuous video feed from the camera, and when the user performs the prompted gesture; record values of the collective transform data based on at least one start recording criterion and at least one stop recording criterion being met, to generate a timeline of collective transform data; identify, a gesture corresponding to the generated timeline for interacting with the virtual object; map, the identified gesture to a user action from an Augmented Action library (AAL); and enable, the tactile interaction between the physical object and the virtual object, by translating the user action associated with the physical object to the virtual object, based on the mapping and visually represented in the augmentation.

In yet another aspect, there is provided one or more non-transitory machine-readable information storage mediums comprising one or more instructions which when executed by one or more hardware processors cause: initiating, via a system in communication with a camera and an Extended Reality (XR) setup, a request for an XR viewing of a virtual object using (i) a marker-based approach, wherein the XR setup comprises a corresponding software development kit (SDK) or (ii) a markerless or a location-based approach, wherein the XR setup comprises the corresponding SDK and an object detection SDK; prompting a user, via one or more hardware processors comprised in the system, in response to the request, to hold a physical object in the camera's view and perform a gesture, wherein the physical object having an associated form factor serves as at least one of (i) a marker, and (ii) a controller, coupled to the virtual object for tactile interaction therebetween; obtaining, via the one or more hardware processors, (i) a collective transform data based on generated transform data and (ii) an augmentation from the XR setup using either (a) the marker coupled to the virtual object, (b) by scanning a user's environment by the camera or (c) turning on the camera, wherein the transform data is generated in the form of a position, an orientation and a scale associated with (i) the physical object and (ii) at least one hand of the user handling the physical object, from a continuous video feed from the camera, and when the user performs the prompted gesture; recording, via the one or more hardware processors, values of the collective transform data based on at least one start recording criterion and at least one stop recording criterion being met, to generate a timeline of collective transform data; identifying, via the one or more hardware processors, a gesture corresponding to the generated timeline for interacting with the virtual object; mapping, via the one or more hardware processors, the identified gesture to a user action from an Augmented Action Library (AAL); and enabling, via the one or more hardware processors, the tactile interaction between the physical object and the virtual object, by translating the user action associated with the physical object to the virtual object, based on the mapping and visually represented in the augmentation.

In accordance with an embodiment of the present disclosure, the at least one start recording criterion comprises: (i) change in an orientation of the physical object by at least an empirically determined angle in at least one axis, (ii) the physical object or positions of landmarks of at least one hand move by an empirically determined absolute distance represented in Normalized Device Coordinates (NDC) space, and (iii) a change in scale of the physical object by at least an empirically determined value; and the at least one stop recording criterion comprises: (i) the at least one hand or the physical object does not move for an empirically determined time duration, (ii) the recording exceeds an empirically determined recording time, and (iii) the at least one hand or the physical object is not visible to the camera.

In accordance with an embodiment of the present disclosure, the empirically determined angle is 30 degrees, the empirically determined absolute distance is 0.1 unit, the empirically determined value is 0.25, the empirically determined time duration is 1 second, and the empirically determined recording time is 5 seconds.

In accordance with an embodiment of the present disclosure, the one or more hardware processors are configured by the instructions to derive metrics including: (i) FingerTips Covered Distance (FTCD) being a distance covered throughout the gesture by each individual fingertip of the at least one hand, (ii) FingerTips Covered Distance Curve (FTCDC) being an array of Float32Array containing distance covered by each fingertip of the at least one hand per frame throughout the gesture, (iii) major fingertips being fingertips of the at least one hand that are actively associated with the performed gesture and characterized by FTCD being at least 50% of the largest FTCD, (iv) FingerTips Center of Gravity Curve (FTCGC) being an array comprising Center of Gravity (CG) of a closed shape created by connecting the positions of landmarks of each fingertip of the at least one hand, (v) Finger Center of Gravity Curve (FCGC) being a Float32Array comprising center of gravity for individual fingers in each frame, and (vi) identification of the at least one hand of the user being a left hand, a right hand or both.

In accordance with an embodiment of the present disclosure, the one or more hardware processors are configured by the instructions to identify a gesture corresponding to the generated timeline by: periodically receiving a portion of the recorded collective transform data during the step of generating the timeline; filtering previously generated timelines in a Gesture Transform Library (GTL) by comparing each portion received periodically with identical portions thereof, based on (i) a form factor of the physical object, (ii) identification of the at least one hand used being the left hand, the right hand or both, (iii) the major fingertips, (iv) 3D curve of the FCGC using curve matching, (v) 3D curve of the FTCDC using curve matching, and (vi) 3D curve of the FTCGC using curve matching; creating 3D curves associated with (i) the periodically received portions, using the transform data associated with landmarks of fingertips of the used at least one hand and the transform data of the physical object and (ii) the filtered timelines in the GTL using curve matching; computing, a 2-dimensional (2D) array of results, based on an associated confidence level generated after comparing the created 3D curves, wherein a first dimension corresponds to each of the received portions and a second dimension is an array of associated results; in response to a cumulation request generated when the at least one stop recording criterion is met, receiving a last portion of the recorded collective transform data and combining the computed 2D array of results to obtain a 1-dimensional (1D) array of results corresponding to the generated timeline; and identifying a result from the 1D array of results that corresponds to the gesture for interacting with the virtual object based on a selection criterion from a plurality of selection criteria.

In accordance with an embodiment of the present disclosure, wherein the plurality of selection criteria comprises: criterion 1 pertaining to the number of results in the 1D array, wherein (i) if the 1D array is empty, then adding a new gesture corresponding to the generated timeline to the GTL; (ii) if the 1D array has one result, then the result corresponds to the gesture for interacting with the virtual object; and (iii) if the 1D array has more than one result, selecting a result based on an associated confidence value and a recorded length; criterion 2 pertaining to a difference between confidence values, wherein confidence values of results in the 1D array are compared with a result having a highest confidence value; the results in the 1D array having a difference in confidence values greater than a predefined value are eliminated and criterion 1 pertaining to the number of results in the 1D array is executed on the remaining results in the 1D array, while the results in the 1D array having a difference in the confidence values less than the predefined value are checked with reference to associated recorded length; criterion 3 pertaining to a check for multiple gestures, wherein if the associated recorded lengths are equal for all the results, combining the results to form a new gesture and adding to the GTL; and if the recorded length of at least one result is unequal when compared to the remaining results in the 1D array, executing a criterion 4; and criterion 4 pertaining to recorded length of the generated timeline, wherein the results having a matching recorded length with the generated timeline are combined to form a new gesture and adding to the GTL, while the remaining results in the 1D array are eliminated; and if the recorded length of no result matches with that of the generated timeline, a new gesture is added to the GTL.

In accordance with an embodiment of the present disclosure, the one or more hardware processors are configured by the instructions to combine the results in criterion 3 and criterion 4 by: obtaining the CG for the landmarks of the used at least one hand and objection detection using the associated transform data at each frame in the generated timeline, wherein the obtained CG serves as a new transform data; checking the FTCGC for humanly possible conditions including (i) the CG of the fingertips always remains above a palm reference plane, and (ii) the FTCGC never falls outside a flat fingertips boundary based on a polygon created with a surface normal facing above the palm represented by the landmarks and a perpendicular distance of the FTCGC from the palm reference plane; recalculating the transform data using linear interpolation by considering two previous frames, if there are frames in the generated timeline when the humanly possible conditions are not met; and computing the FTCD, the FTCDC, the major fingertips, the FCGC and the FTCGC corresponding to a new gesture, using the recalculated transform data; and adding the new gesture to the GTL.

In accordance with an embodiment of the present disclosure, the one or more hardware processors are configured by the instructions to, when mapping the identified gesture to a user action, perform one or more of (i) mapping the identified gesture to an existing action or a new action created in the AAL; and (ii) storing a new mapping in a Gesture to Action Mapping (GAM) Library.

In accordance with an embodiment of the present disclosure, the one or more hardware processors are further configured by the instructions to perform, prior to initiating the request for the XR viewing, pre-processing of a plurality of 3D models of objects available on an XR viewing enabled platform, to generate a list of physical objects having a size comparable with a user's hand based on an associated form factor, wherein the pre-processing comprises: creating an orthographic alpha map data for all six orthographic views of each 3D model in the plurality of 3D models using a 3D engine; converting the created orthographic alpha map data into six alpha maps as image files; classifying, shapes present in each of the six alpha maps using a Machine Learning (ML) classifier based on an associated confidence value; converting the classified shapes into corresponding 3D forms; and mapping the 3D forms to physical objects having matching form factors to generate the list of physical objects.

In accordance with an embodiment of the present disclosure, the one or more hardware processors are configured by the instructions to perform, when prompting a user to hold a physical object, one or more of: (i) prompting the user to hold one of one or more physical objects from the generated list of physical objects; or (ii) receiving a continuous video feed from the camera; identifying one or more physical objects in the user's environment comprised in the generated list of physical objects using an object detection SDK; and prompting the user to hold one of the identified one or more physical objects It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A through FIG. 3B illustrate an exemplary flow diagram of a computer implemented method for gesture based tactile interaction in extended reality using form factor of a physical object, in accordance with some embodiments of the present disclosure.

FIG. 8A illustrates positions of landmarks of a hand, detected by a hand tracking model, as known in the art.

FIG. 8B illustrates a FingerTips Center of Gravity Curve (FTCGC), in accordance with some embodiments of the present disclosure.

FIG. 8C illustrates subdividing of a polygon $(P_{4, 8, 12, 16, 20})$ further into three triangles for calculating the FTCGC, in accordance with some embodiments of the present disclosure.

FIG. 8D illustrates a resultant Center of Gravity (CG) from CGs obtained for the three triangles of FIG. 8C, in accordance with some embodiments of the present disclosure.

FIG. 8E illustrates a palm reference plane, in accordance with some embodiments of the present disclosure.

FIG. 8F illustrates a flat finger boundary, in accordance with some embodiments of the present disclosure.

FIG. 8I illustrates a Finger Center of Gravity Curve (FCGC) polygon for an index finger, in accordance with some embodiments of the present disclosure.

FIG. 8J illustrates a subdivided polygon of FIG. 8I, in accordance with some embodiments of the present disclosure.

FIG. 12A through FIG. 12D illustrate a use case of the method in a Visual Positioning System (VPS)/location-based Augmented Reality (AR) experience, in accordance with some embodiments of the present disclosure.

FIG. 13A through FIG. 13E illustrate a use case of the method in an Object Detection and superimposition experience, in accordance with some embodiments of the present disclosure.

FIG. 14A through FIG. 14E illustrate a use case of the method in a markerless AR experience, in accordance with some embodiments of the present disclosure.

DETAILED DESCRIPTION

Figure 1:
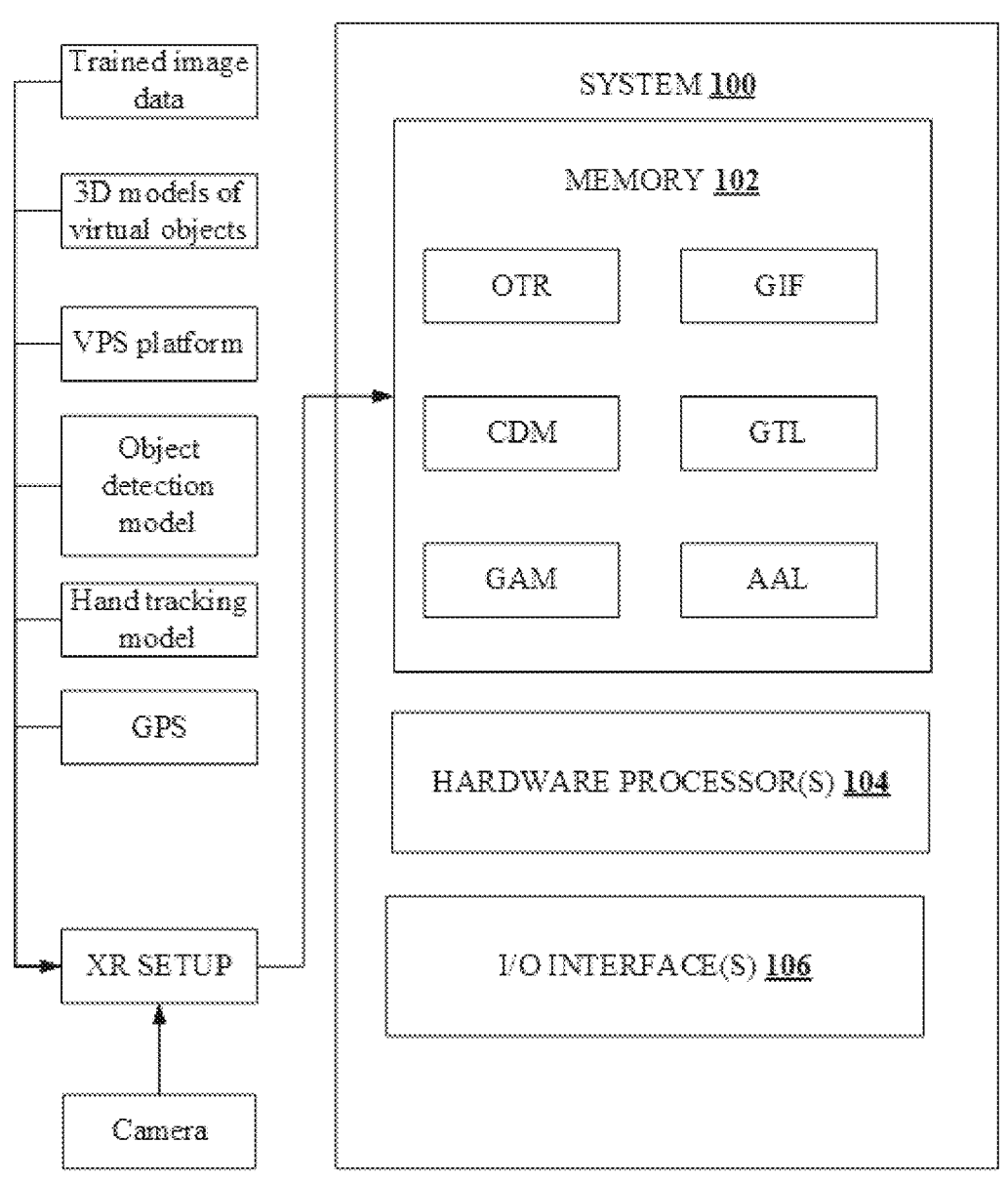
FIG. 1 illustrates an exemplary block diagram of a system for gesture based tactile interaction in extended reality using form factor of a physical object, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Extended Reality (XR) including forms of digital reality such as Augmented Reality (AR), Mixed Reality (MR), and Virtual Reality (VR) is primarily driven by visuals layers to display information to a user. Tactile and gestural inputs have traditionally been ignored in XR experiences. Displaying merely visuals of a product is limiting when it comes to fully experiencing a product. To manipulate or interact with an augmentation (interchangeably referred as an augmented image), a user typically needs to rely on User interface (UI) elements such as buttons or icons on screen. These UI elements occupy precious real-estate and obstruct view of the augmentation. Alternatively, the user can be presented with UI elements in XR as well, however these elements are not user friendly since they keep moving with the augmentation (image). Too many (3 or more) such XR UI elements can be overwhelming and can distract from the augmentation. It is also difficult to hold a physical object serving as a marker or a controller or both, in hand and simultaneously click on these UI elements.

In accordance with the present disclosure, a multi-sensory perception approach, where the user is more immersed in the presented experience has been provided to address the technical problem mentioned above. Click interactions have been eliminated. By combining natural hand gestures with the form factor of a physical object serving at least as one of a marker and a controller, tactile inputs from the hand-held physical object helps perceive and better experience a product. In accordance with the present disclosure, transform data in the form of a position, an orientation and a scale associated with the physical object and user's at least one hand handling the physical object is recorded to identify an associated gesture. Utilizing gesture to action mapping, the user's action is translated to a virtual product. The augmentation is modified in real time to provide an immersive experience.

Referring now to the drawings, and more particularly to FIG. 1 through FIG. 14E, where similar reference characters denote corresponding features consistently throughout the figures, there are shown preferred embodiments and these embodiments are described in the context of the following exemplary system and/or method.

FIG. 1 illustrates an exemplary block diagram of a system 100 for gesture based tactile interaction in extended reality using form factor of a physical object, in accordance with some embodiments of the present disclosure. In an embodiment, the system 100 includes one or more hardware processors 104, communication interface (s) or input/output (I/O) interface(s) 106, and one or more data storage devices or memory 102 operatively coupled to the one or more hardware processors 104. The one or more hardware processors 104 can be implemented as one or more microprocessors, microcomputers, microcontrollers, digital signal processors, central processing units, state machines, graphics controllers, logic circuitries, and/or any devices that manipulate signals based on operational instructions.

Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, and the like communicating with a camera.

The communication interface (s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

Figure 2:
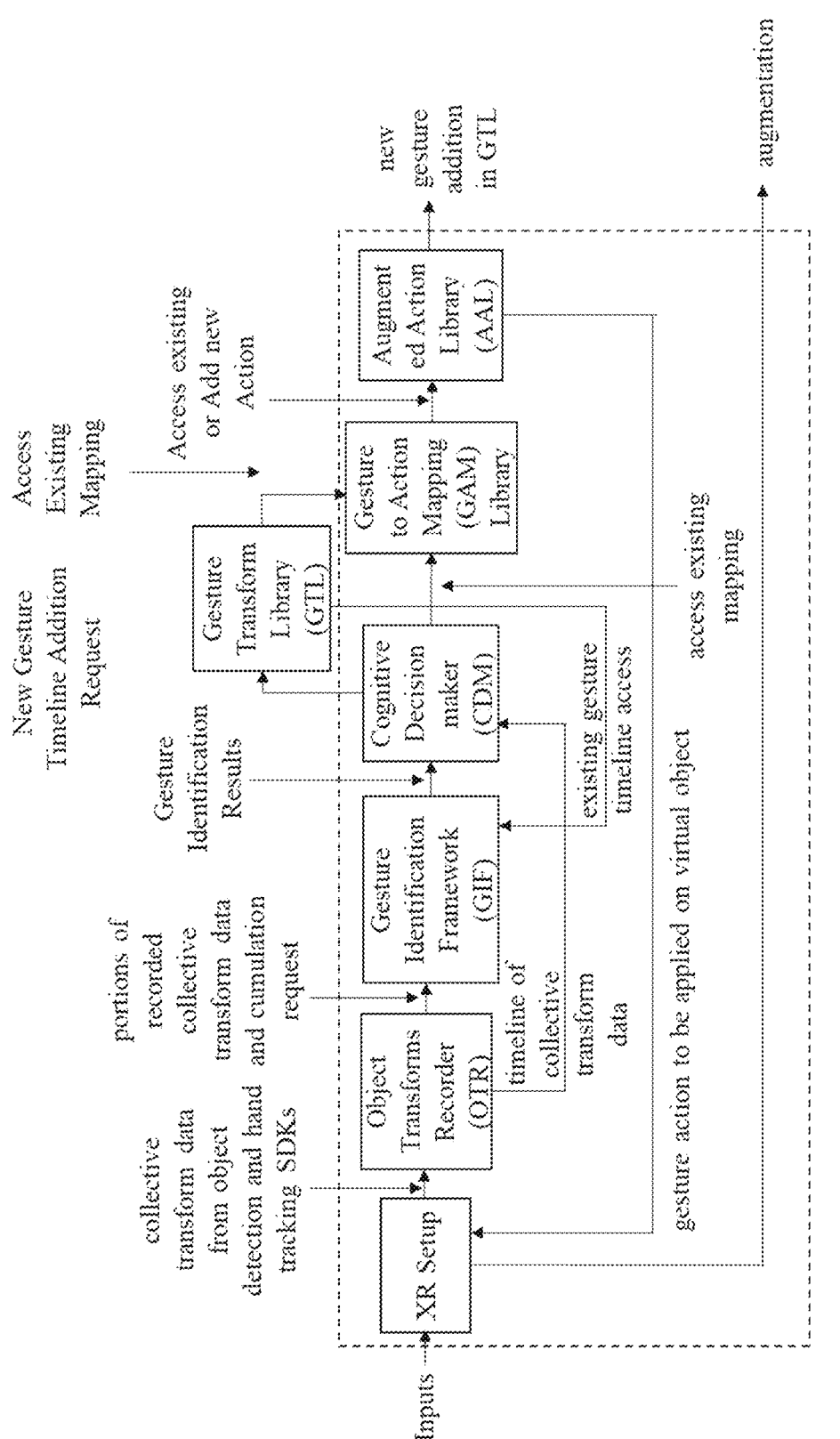
FIG. 2 illustrates an input/output diagram of the system of FIG. 1, in accordance with some embodiments of the present disclosure.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. FIG. 2 illustrates an input/output diagram of the system of FIG. 1, in accordance with some embodiments of the present disclosure. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis, particularly functionalities represented by modules (described herein below) illustrated in FIG. 1 and FIG. 2. The modules are implemented as at least one of a logically self-contained part of a software program, a self-contained hardware component, and/or, a self-contained hardware component with a logically self-contained part of a software program embedded into each of the hardware component that when executed perform the method 300 described hereinafter. Accordingly, the modules are invoked by the one or more hardware processors 104 to perform the method 300 of the present disclosure. In accordance with the present disclosure, the modules include:

an XR Setup,
an Object Transforms Recorder (OTR),
a Gesture Identification Framework (GIF),
a Cognitive Decision maker (CDM),
a Gesture Transform Library (GTL),
a Gesture to Action Mapping (GAM) Library, and
an Augmented Action Library (AAL).

Inputs to the XR setup are processed to output collective transform data (objection detection transform data and hand tracking transform data) and an augmentation corresponding to the XR setup. The OTR records the collective transform data over a period of time to capture a pattern and make meaning of it. While the OTR transmits portions of the recorded collective transform data in real time to the GIF, the OTR also sends a complete recording forming a timeline of the collective transform data to the CDM. The GIF utilizes the timeline to check for user behavior, i.e., which gesture is being performed, by cross referencing the timelines with already existing data from GTL. The result is an array of behaviors from the GTL with associated confidence levels. The CDM is responsible to filter out or decide which one of the user behaviors (gestures) provided by the GIF to utilize for finding the corresponding action.

Generally, the behavior which has the highest confidence level is considered for action when there is a large difference in confidence levels between different behaviors. When the differences are less, the CDM registers the behavior as a new gesture in the GTL by intelligently combining the behaviors given by the GIF and utilizing the GAM to construct a seamless gestural pattern. Once the CDM identifies a particular gesture, it requests the GAM to provide a respective action to be carried out on the augmentation. Both the GAM and the AAL are open to the user for customization. The AAL contains some defaults actions that can be carried out on standard augmented images. More actions can be added for specific forms that can be carried out on the augmented image. The GAM allows users to map certain action to specific gestures. The GAM works with the AAL to decide which action needs to be performed for a particular gesture. In case of new gestures being registered by the CDM, either a new action is created and mapped to the new gesture or an existing action is mapped to the new gesture. Once the user performs the gestures, it is sent to the XR setup, and the system performs the corresponding action on the augmentation.

Figure 3A:
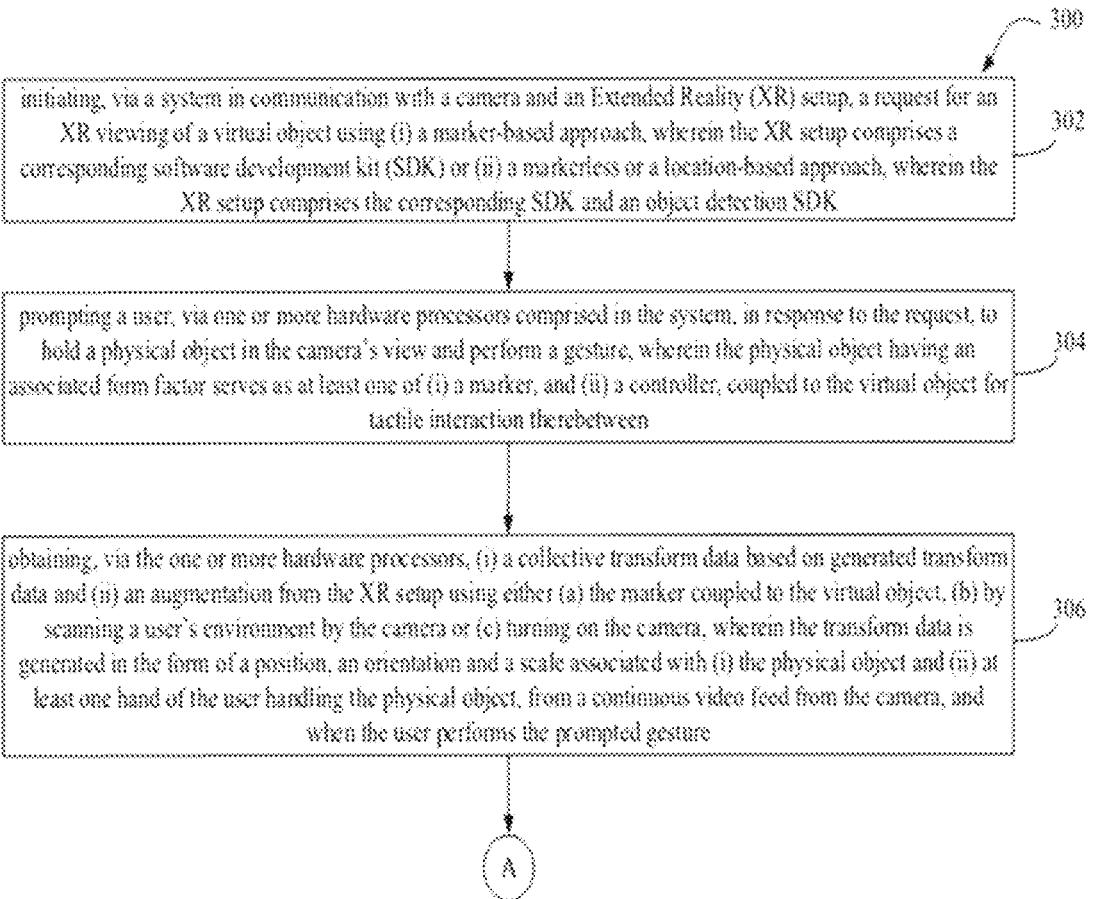

FIG. 3A through FIG. 3B illustrate an exemplary flow diagram of a computer implemented method 300 for gesture based tactile interaction in extended reality using form factor of a physical object, in accordance with some embodiments of the present disclosure. In an embodiment, the system 100 includes the memory 102 operatively coupled to the one or more hardware processors 104 and is configured to store instructions configured for execution of steps of the method 300 by the one or more hardware processors 104. The steps of the method 300 will now be explained in detail with reference to the components of the system 100 of FIG. 1 and the input/output diagram of the system as illustrated in FIG. 2, in accordance with some embodiments of the present disclosure. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Figure 4:
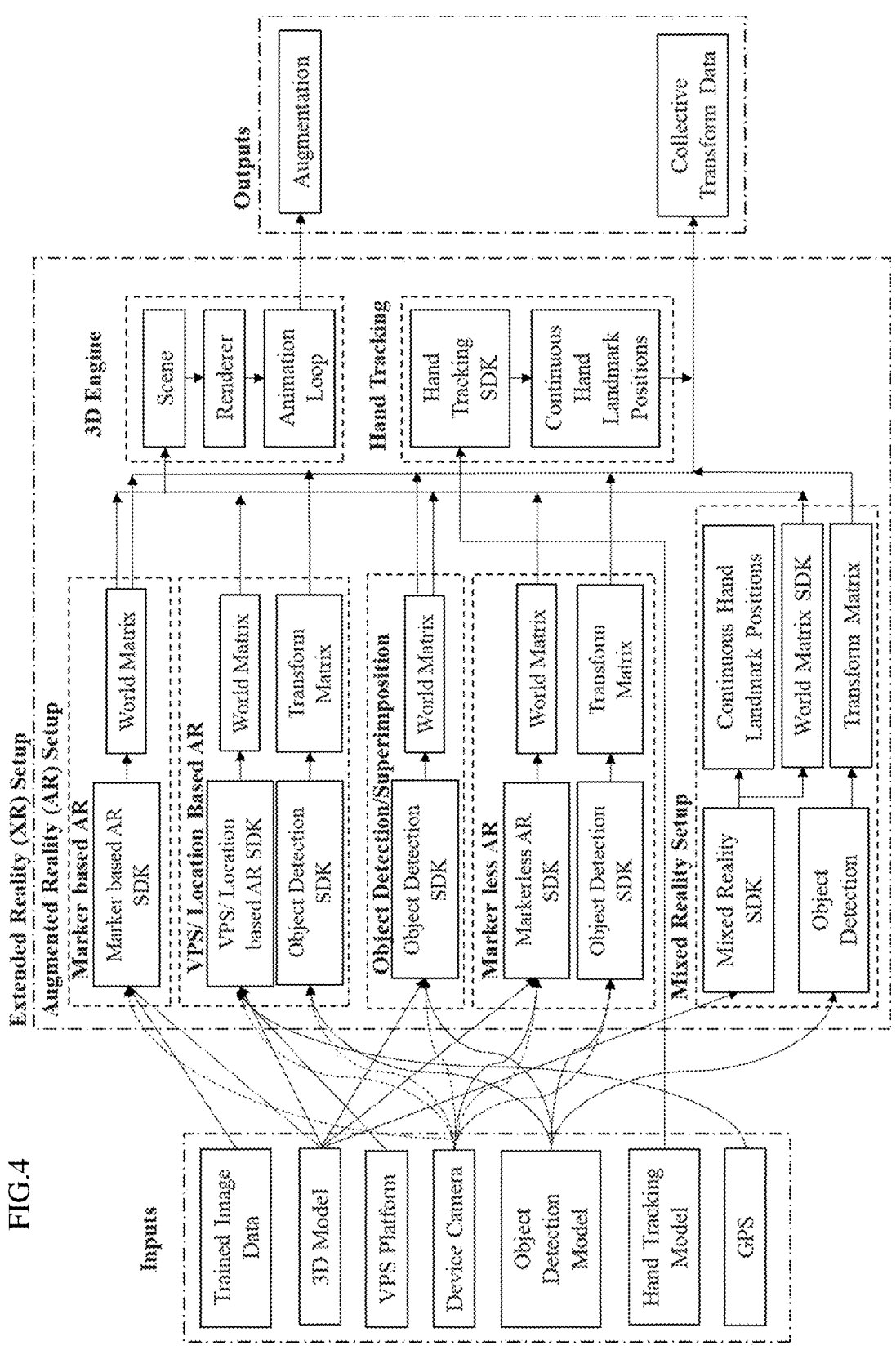
FIG. 4 illustrates an input/output diagram for an Extended Reality (XR) setup comprised in the diagram of FIG. 2, in accordance with some embodiments of the present disclosure.

In an embodiment of the present disclosure, the one or more hardware processors 104 of the system 100 communicating with a camera and an Extended Reality (XR) setup, are configured to initiate, at step 302, a request for an XR viewing of a virtual object via (i) a marker-based approach using an XR setup comprising a corresponding software development kit (SDK) or (ii) a markerless or a location-based approach using the XR setup comprising the corresponding SDK and an object detection SDK (Refer FIG. 4). The virtual object is a product from the list of products available in the XR viewing enabled platform. It may be noted by those skilled in the art that in the context of the present disclosure, the expressions 'product(s)' and 'object(s)' are used interchangeably. In response to the request, at step 304, the user is prompted to hold a physical object in the camera's view and perform a gesture, wherein the physical object having an associated form factor serves as at least one of (i) a marker, and (ii) a controller, coupled to the virtual object for facilitating a tactile interaction between them.

Transform data is generated by the XR setup in the form of a position, an orientation and a scale associated with (i)

the physical object and (ii) at least one hand of the user handling the physical object, from a continuous video feed from the camera, and when the user performs the prompted gesture. In accordance with the present disclosure, the gestures to be performed for manipulating the virtual object or enabling certain action on the virtual object can be provided to the user during an onboarding process for the XR viewing enabled platform. The step of generating the transform data associated with the physical object, by the XR setup, comprises receiving a continuous video feed from the camera; and detecting the physical object by (i) performing object recognition if the physical object has comparable length on all sides, else (ii) performing image recognition.

FIG. 4 illustrates an input/output diagram for the XR setup comprised in the diagram of FIG. 2, in accordance with some embodiments of the present disclosure. The XR set up can be one of an AR setup, a VR setup or an MR setup wherein the SDKs or frameworks integrate with a 3-Dimensional (3D) engine to render real time XR experience. In an embodiment, the SDKs or frameworks can be Zappar™, 8th Wall™, Model-Viewer™, Microsoft's Mixed Reality Toolkit (MRTK™), and the like. Exemplary experiences by the XR setup (Refer FIG. 4) include the following:

Marker-based AR SDK: tracks the physical object and augments the 3D model (virtual object) on top of it. There is no need for separate object detection since the physical object in the user's hand serves as the marker. In this experience, the physical object serves as both, the marker and the controller. An exemplary marker-based SDK is provided by Zappar™. A visiting card can be used as the physical object to augment a similar form factor 3D object in AR like a smartphone. Zappar™ provides ZapWorks CLI, a command line utility to train any image to form trained image data that is input the marker-based AR SDK along with the video feed from the camera and the 3D model of the object such as the smartphone. The output of the marker-based AR SDK is a digital world matrix fed to a digital tracker object being a digital 3D entity which is digitally anchored in the 3D engine at the physical object's position in the physical (real) world.

Visual Positioning System (VPS)/location-based AR SDK: used to place 3D models in open spaces. While VPS works with point clouds, location-based AR works with GPS locations, both the experiences being tied to a specific location. This experience requires object detection to be performed. Sturfee™ is an exemplary VPS solution provider where users can place digital content anywhere in a city (city should be mapped into point cloud prior to enabling users to place digital content) and can later view it. Inputs to this SDK include the video feed from the camera, VPS framework such as Sturfee™ (applicable only to VPS AR), the 3D model and GPS location (applicable only to location-based AR).

Object Detection and superimposition SDK: another form of AR, wherein the position of a physical object is tracked using object detection and a digital 3D model is superimposed on top of it. It is crucial that both the digital 3D model and the physical object have the same form factor. A digital 3D model of a pen torch can be overlaid on top of a physical pen held in a user's hand using Objectron by Mediapipe™. The inputs to the SDK include the video feed from the camera, the object detection model and the 3D model while the output is a digital world matrix fed to a digital tracker object being a digital 3D entity which is used by the 3D engine to overlay a digital object on top of the physical object in the video feed.

Markerless AR SDK: allows placement of a digital 3D model on top of a flat physical surface. The augmentation happens when the SDK scans a flat surface through the camera. The physical object cannot be of the same form factor to get the tactile experience of the digital product. Even if a similar physical object is placed on ground surface to emulate superimposition, the user will not be able to transform it easily. In this type of XR experience, a smaller, hand-held physical object is used which serves only as the controller to transform the digital object and not provide a tactile experience with reference to the form factor of the digital 3D product. Inputs to this SDK include the video feed from the camera and the 3D model. A digital 3D model of a sofa can be placed over a plane surface using Model-Viewer™, while a pen or pencil (physical object) can be used as the controller to rotate the sofa around its pivot by rolling the pen or pencil. The output of this SDK is a digital world matrix which guides the 3D engine to place a digital 3D model in the real (physical) world.

MR SDK: Object detection is also used in combination with Mixed reality SDK to detect physical objects and determine its transforms. If object detection is present in mixed reality SDK, then a separate object detection SDK is not required. MRTK™ is an exemplary SDK which can be used to build MR experiences. Interacting with a functional digital 3D model (digital twin) of a turbine can be made possible by using a cylindrical object like a soda can. The digital twin can be placed on top of a surface and the soda can; for transforming the turbine's digital twin. The tracking of the soda can and hand gestures together provide a tactile experience of interacting with the digital twin of turbine. Inputs to this SDK include the video feed from the camera and the 3D model, while outputs from this SDK are digital world matrix to place the 3D model and transforms of hand landmarks (joints on the fingers as well as the finger-tips).

Referring to the exemplary experiences described above, inputs to the XR setup include, as applicable, trained image data (applicable to marker-based and object detection and superimposition), 3D models of virtual objects (products) available in an XR viewing enabled platform, a VPS platform, a camera, an object detection model, a hand tracking model and a Global Positioning System (GPS).

The object detection model is a machine learning (ML) model trained to detect and track real-life physical objects and determine their transforms (position, orientation, scale). An exemplary object detection model is Objectron by Mediapipe™.

The hand tracking model is an ML model trained to detect and track human hand transforms. An exemplary hand tracking model is MediaPipe™. It offers 21 landmarks for each hand. The data pertaining to the landmarks contain their 3D position with respect to the continuous video feed.

The 3D engine is a rendering engine that performs computations necessary for 3D computer graphics operation. It consists of (i) a scene which represents a 3D space (user's environment) and everything in it, (ii) a renderer which renders anything visible in the camera's view along with anything present in the scene, and (iii) an animation loop to keep updating the 3D scene. An exemplary 3D engine is Three.js™, a web 3D engine which renders 3D scenes on Web Graphics Library (WebGL).

In an embodiment of the present disclosure, the one or more hardware processors 104 are configured to obtain, at step 306, outputs from the XR setup in the form of (i) a collective transform data (objection detection transform data and hand tracking transform data) based on the transform data generated by the XR setup, and (ii) an augmentation using either (a) the marker coupled to the virtual object, (b) by scanning (markerless approach) a user's environment by the camera or (c) turning on (location based approach) the camera.

Figure 5:
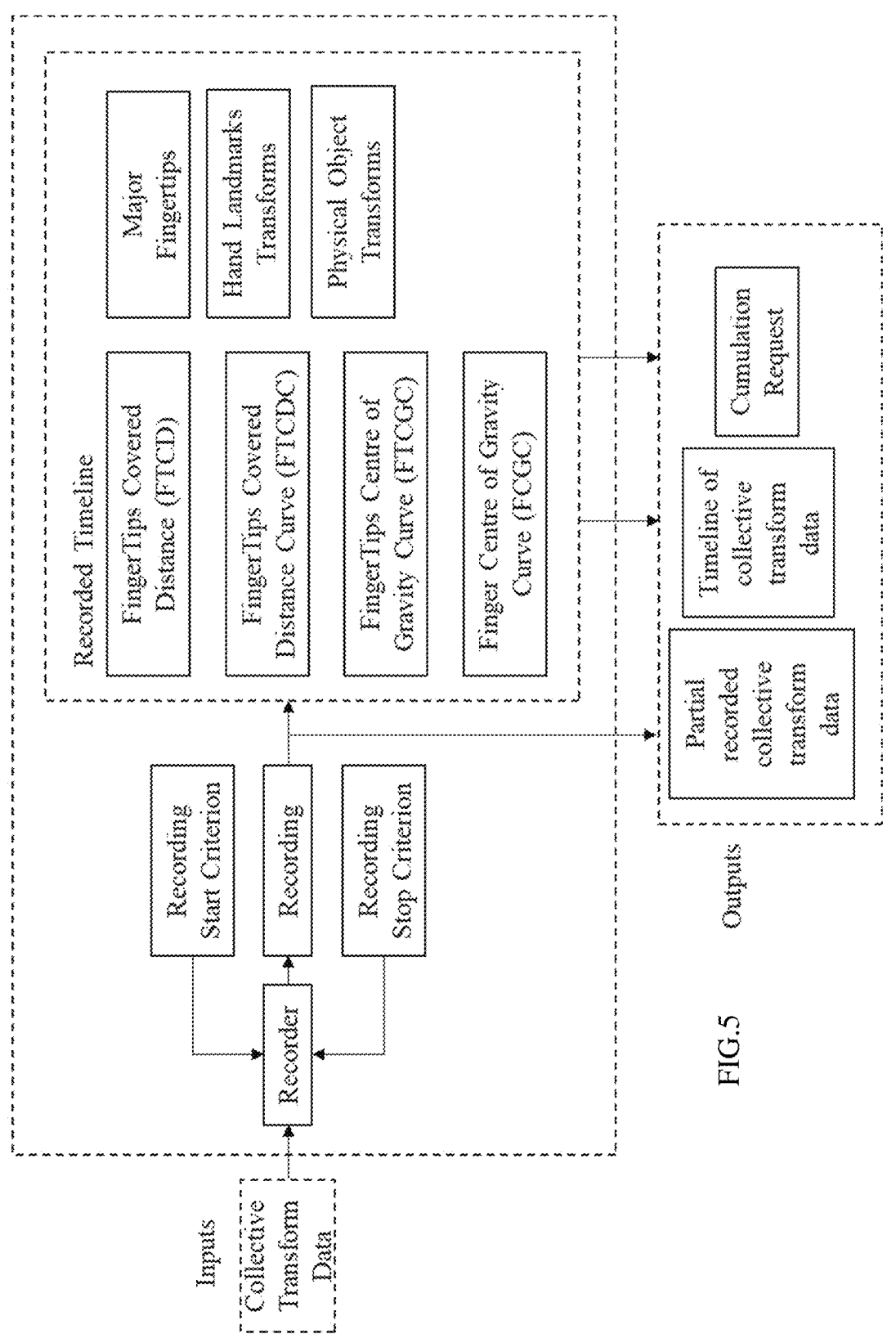
FIG. 5 illustrates an input/output diagram for an Object Transforms Recorder (OTR) comprised in the diagram of FIG. 2, in accordance with some embodiments of the present disclosure.

In an embodiment of the present disclosure, the one or more hardware processors 104, are configured to record via the OTR, at step 308, values of the collective transform data based on at least one start recording criterion and at least one stop recording criterion being met, to generate a timeline (full recording) of collective transform data that is stored in the GTL. FIG. 5 illustrates an input/output diagram for the OTR comprised in the diagram of FIG. 2, in accordance with some embodiments of the present disclosure. In accordance with the present disclosure, the OTR reorders the values of the collective transform data to fit into a float32Array that compacts the data by eliminating its object structure and converting it into a typed Array. While the OTR records values of the collective transform data, it further derives the following six metrics:

FingerTips Covered Distance (FTCD) is a distance covered throughout the gesture by each individual fingertip of the at least one hand. This variable contains an array value in Float32Array format. It has as many elements as the number of fingers. This metric is derived by measuring a displacement between the fingertips between two frames and adding it up from start until the end of the gesture. This metric is associated with each of the fingertips and is represented as given below.

$$FTCD = \sum_{i=0}^{i=n} FTCDC_i \quad n = gestureFrameLength$$

FingerTips Covered Distance Curve (FTCDC) is an array of Float32Array containing distance covered by each fingertip of the at least one hand per frame throughout the gesture. This array has a length equal to the number of frames.

Major fingertips are fingertips of the at least one hand that are actively associated with the performed gesture and characterized by FTCD being at least 50% of the largest FTCD. The fingertip which covers the largest distance FTDC is the first major fingertip. If other FTCDs are equal to or more than 50% of the largest FTCD, they contribute to major fingertips. Major fingertips are constant for a particular humanly possible gesture.

FingerTips Center of Gravity Curve (FTCGC) is an array comprising Center of Gravity (CG) of a closed shape created by connecting the positions of landmarks of each fingertip of the at least one hand. This metric is captured for all frames of a gesture in a Float32Array. The length of this array is equal to a gesture array length. This metric plotted on a graph against time creates a curve of how the CG of all fingertips varies throughout the gesture.

Finger Center of Gravity Curve (FCGC) is a Float32Array comprising center of gravity for individual fingers in each frame. The metric is represented by an array of Float32Arrays which has a length equal to a gesture array length. This simplifies the complex motion of a finger throughout the gesture. The metric is used to filter results before curve matching in the GIF. Fingertip Center of Gravity is calculated by finding the CG of the quadrilateral formed by the three joints and fingertip in a finger. The quadrilateral is divided into two triangles formed with the common vertex at finger root (knuckle joint for a finger). The CGs of the two triangles are calculated. The two CGs thus form a straight line. The resultant CG of the quadrilateral is the center point of the two CGs. Finger Center of Gravity is different for all the fingers. Thus, the Finger Center of Gravity Curve is different for all fingers.

Identification of the at least one hand of the user being a left hand, a right hand or both.

Hand landmarks transforms: In accordance with the present disclosure, the position of each landmark on a hand is captured per frame for the entire gesture duration. Each landmark has its own Float32Array containing x, y and z parameters of the position of the respective landmark for each frame. In total, using Mediapipe™, the output landmarks are 21 in numbers, so this variable is an array of 21 Float32Array containing position data for all landmarks.

Physical object transforms: In accordance with the present disclosure, it is an array which consists of three Float32 Arrays to contain the position, rotation and scale properties of the physical object. The length of these three arrays is equal to a gesture array length.

In an embodiment of the present disclosure, the at least one start recording criterion comprises: (i) change in an orientation of the physical object changes by at least an empirically determined angle in at least one axis, (ii) the physical object or the positions of landmarks of at least one hand landmarks move by an empirically determined absolute distance represented in Normalized Device Coordinates (NDC) space, and (iii) a change in scale of the physical object by at least an empirically determined value. In an embodiment, the empirically determined angle is 30 degrees, the empirically determined absolute distance is 0.1 unit and the empirically determined value is 0.25.

In an embodiment of the present disclosure, the at least one stop recording criterion comprises: (i) the at least one hand or the physical object does not move for an empirically determined time duration, (ii) the recording exceeds an empirically determined recording time, and (iii) the at least one hand or the physical object is not visible to the camera. In an embodiment, the empirically determined time duration is 1 second, and the empirically determined recording time is 5 seconds.

In an embodiment of the present disclosure, the one or more hardware processors 104 are configured to identify, at step 310, a gesture corresponding to the generated timeline for interacting with the virtual object. In accordance with the present disclosure, the OTR transmits periodically a portion of the recorded collective transform data during the step of generating the timeline to the GIF. Typically, equal portions of the recorded collective transform data are transmitted unless the gesture ends and the last portion has a lesser portion. Although the portions (chunks) are transmitted sequentially, transmitting of a next portion is not dependent on the completion of processing of a first transmitted portion, the portions are transmitted as they are recorded. In an exemplary embodiment, of a timeline is of 5 seconds, i.e., 300 frames, the GIF receives a partial recording of 30 frames periodically until the gesture ends. The last chunk of recording may have less than 30 frames. Transmitting partial recording, in accordance with the present disclosure, makes the method 300 efficient since matching a larger dataset is a time-consuming process.

Figure 6:
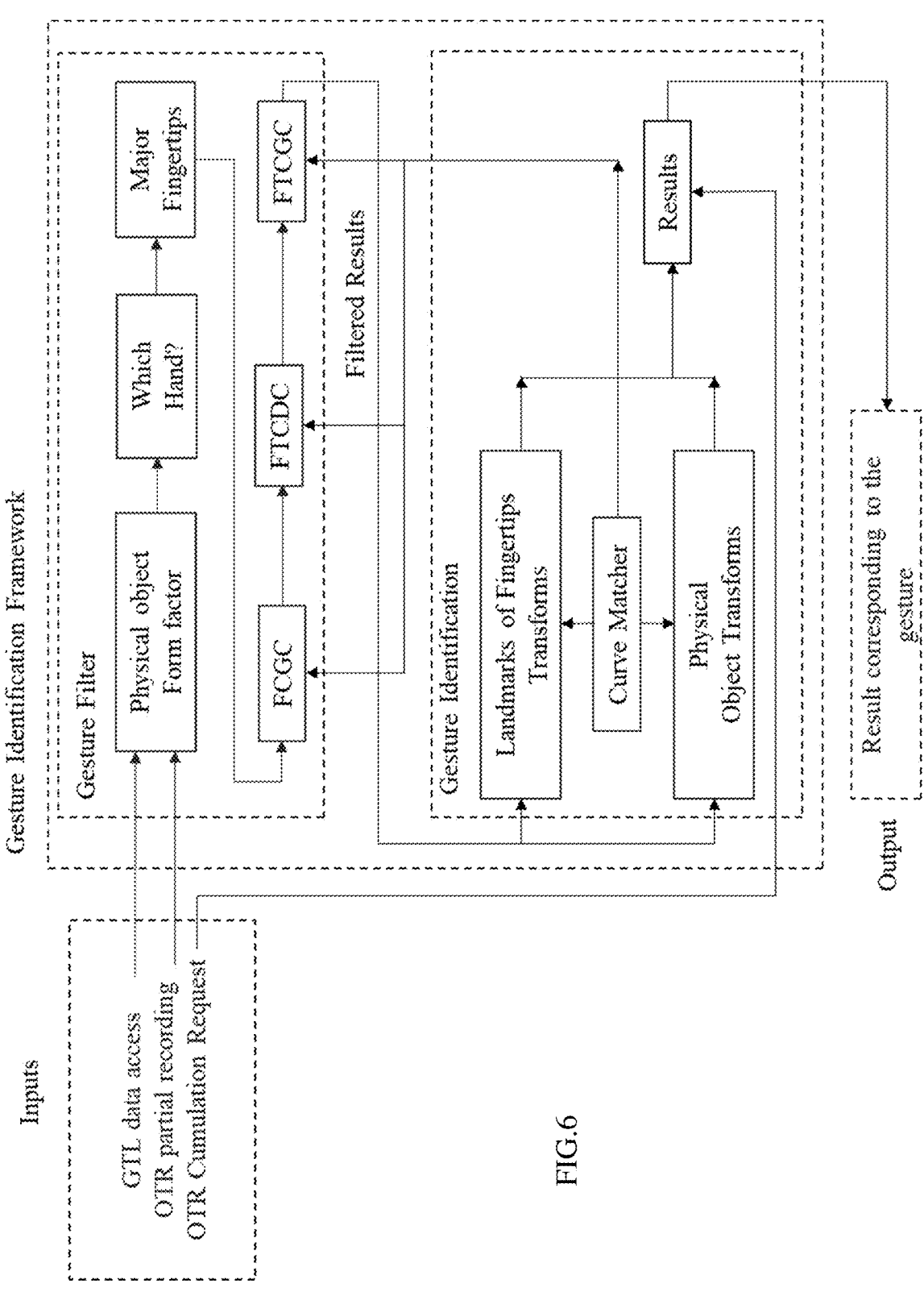
FIG. 6 illustrates an input/output diagram for a Gesture Identification Framework (GIF) comprised in the diagram of FIG. 2, in accordance with some embodiments of the present disclosure.

FIG. 6 illustrates an input/output diagram for the GIF comprised in the diagram of FIG. 2, in accordance with some embodiments of the present disclosure. In accordance with the present disclosure, the step 310 of identifying a gesture associated with the generated timeline comprises periodically receiving a portion of the recorded collective transform data during the step of generating the timeline. Previously generated timelines are stored in the GTL. The partial recordings received are compared with similar portions in the previously generated timelines in the GTL to filter out matching timelines. This matching is performed based on (i) a form factor of the physical object, (ii) identification of the at least one hand used being the left hand, the right hand or both, (iii) the major fingertips, (iv) 3D curve of the FCGC using curve matching, (v) 3D curve of the FTCDC using curve matching, and (vi) 3D curve of the FTCGC using curve matching.

In accordance with the present disclosure, 3D curves associated with (i) the periodically received portions, using the transform data associated with landmarks of fingertips of the used at least one hand and the transform data of the physical object and (ii) the filtered timelines in the GTL are created using curve matching. An exemplary curve matcher is https://github.com/chanind/curve-matcher, wherein shape similarity is checked between two input curves and confidence value in a range [0,1] is output depending on a match between the two input curves. A 2-dimensional (2D) array of results is computed based on an associated confidence level (0 to 1) generated after comparing the created 3D curves. In an embodiment, results with confidence level below 0.4 are filtered out. In the 2D array of results, a first dimension corresponds to each of the received portions and a second dimension is an array of associated results.

When at least one stop recording criterion described above is met, a cumulation request is generated by the OTR as seen in FIG. 5. In response, a last portion of the recorded collective transform data is received by the GIF and the computed 2D array of results are combined to obtain a 1-dimensional (1D) array of results corresponding to the generated timeline, i.e. results having a match for all portions of the recording. From the 1D array of results, a result that corresponds to the gesture for interacting with the virtual object is identified based on a selection criterion from a plurality of selection criteria.

Figure 7:
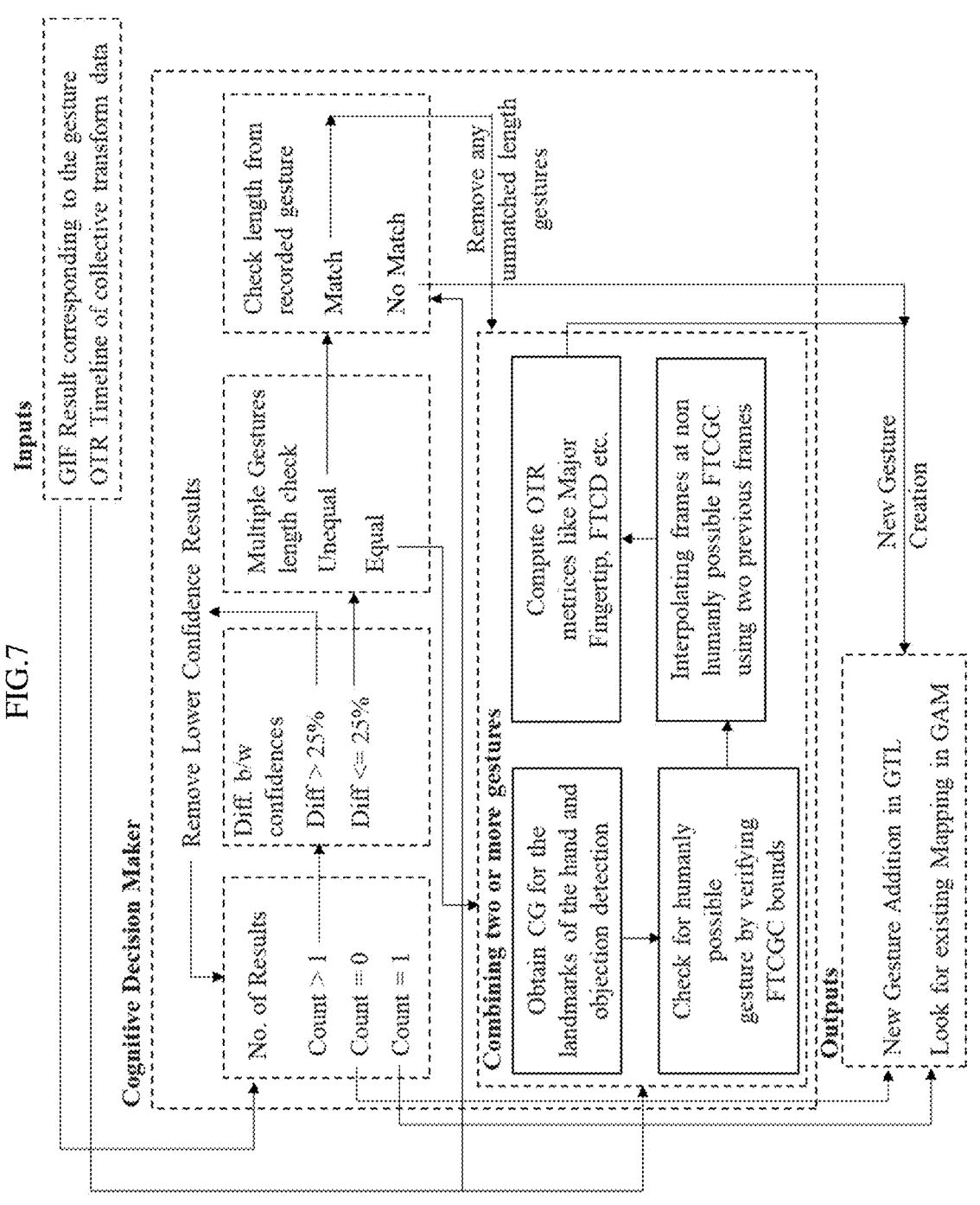
FIG. 7 illustrates an input/output diagram for a Cognitive Decision maker (CDM) comprised in the diagram of FIG. 2, in accordance with some embodiments of the present disclosure.

In accordance with the present disclosure, the CDM identifies the result based on a selection criterion from a plurality of selection criteria. FIG. 7 illustrates an input/output diagram for the CDM comprised in the diagram of FIG. 2, in accordance with some embodiments of the present disclosure. The plurality of selection criteria includes:

Criterion 1 pertains to the number of results in the 1D array: The number of results received from the GIF are checked.

(i) if the 1D array is empty, there is no match or the gesture done by the user is unique, then a new gesture corresponding to the generated timeline is created and added to the GTL; (ii) if the 1D array has one result, then the result corresponds to the gesture for interacting with the virtual object; and (iii) if the 1D array has more than one result, a result based on an associated confidence value and a recorded length is selected as explained later.

Criterion 2 pertains to a difference between confidence values: Confidence values of results in the 1D array are compared with a result having a highest confidence value to obtain the difference. The results in the 1D array having a difference in confidence values greater than a predefined value are eliminated; and criterion 1 pertaining to the number of results in the 1D array is executed on the remaining results in the 1D array. The results in the 1D array having a difference in confidence values less than the predefined value are checked with reference to associated recorded length. In an embodiment, the predefined value is 25%.

Criterion 3 pertains to a check for multiple gestures based on the associated recorded length: If the recorded lengths are equal for all the results, the results are combined to form a new gesture and added to the GTL: and if the recorded length of at least one result is unequal when compared to the remaining results in the 1D array, Criterion 4 is executed.

Criterion 4 pertaining to recorded length of the generated timeline: If the results have a matching recorded length with the generated timeline, they are combined to form a new gesture and added to the GTL, while the remaining results in the 1D array are eliminated; and if the recorded length of no result matches with that of the generated timeline, a new gesture is added to the GTL.

In accordance with the present disclosure, the step of combining the results in criterion 3 and criterion 4 comprises obtaining the CG for the landmarks of the used at least one hand and objection detection using the associated transform data at each frame in the generated timeline, wherein the obtained CG serves as a new transform data. The FTCGC is checked for humanly possible conditions including (i) the CG of the fingertips always remains above a palm reference plane, and (ii) the FTCGC never falls outside a flat fingertips boundary based on a polygon created with a surface normal facing above the palm represented by the landmarks and a perpendicular distance of the FTCGC from the palm reference plane. The transform data is recalculated using linear interpolation by considering two previous frames, if there are frames in the generated timeline when the humanly possible conditions are not met. The metrics viz., the FTCD, the FTCDC, the major fingertips, the FCGC and the FTCGC corresponding to a new gesture are computed using the recalculated transform data. The new gesture is then added to the GTL.

Figure 8G:
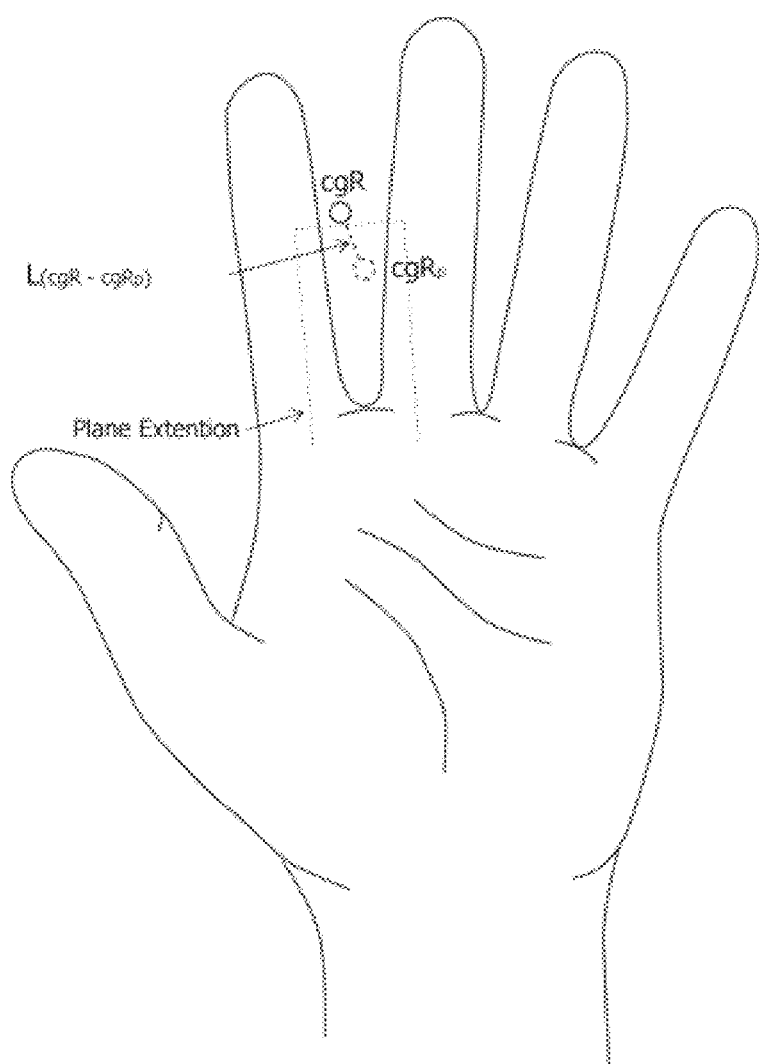
FIG. 8G illustrates a projection of the resultant CG of fingertips on a palm reference plane, in accordance with some embodiments of the present disclosure.
Figure 8H:
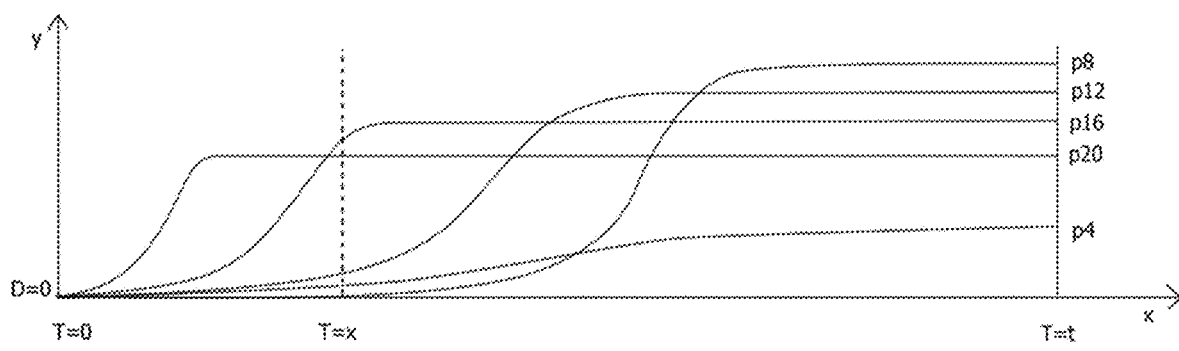
FIG. 8H illustrates a graphical representation of the FTCDC against time, in accordance with some embodiments of the present disclosure.
Figure 8K:
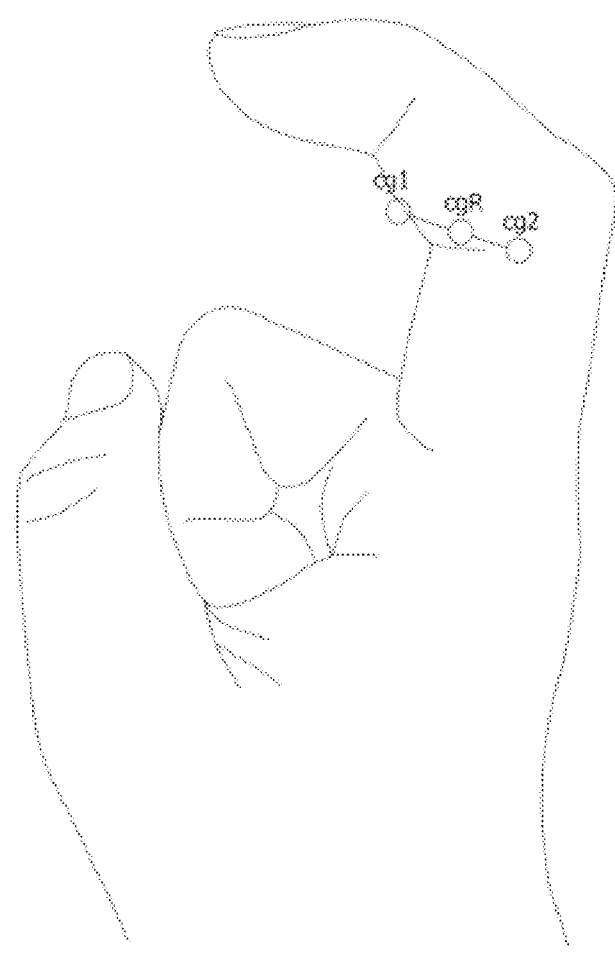
FIG. 8K illustrates Finger Center of Gravity resultant CG for the index finger, in accordance with some embodiments of the present disclosure.

FIG. 8A through FIG. 8G and FIG. I through FIG. 8K represent the metrics derived from the collective transform data while FIG. 8H illustrates a representation using FTCDC. The utilization of the metrics and the representation in accordance with the present disclosure are further explained hereinafter.

Checking the FTCGC for humanly possible conditions: FIG. 8A illustrates positions of landmarks pn of a hand, detected by a hand tracking model, as known in the art. The FTCGC being a locus of the CG of fingertips for a given timeline, is derived by utilizing the positions of landmarks of the fingertip. FIG. 8B illustrates a FingerTips Center of Gravity Curve (FTCGC), in accordance with some embodiments of the present disclosure. The FingerTips Center of Gravity is derived by joining landmarks p4, p8, p12, p16 and p20. The center of gravity of the closed shape $(P_{4, 8, 12, 16, 20})$ thus, formed represents the center of gravity of fingertips $(P_{FTCGC})$.

The calculation of FingerTips Center of Gravity is done by subdividing the polygon $(P_{4, 8, 12, 16, 20})$ further into three triangles. FIG. 8C illustrates subdividing of a polygon $(P_{4, 8, 12, 16, 20})$ further into three triangles for calculating the FTCGC, in accordance with some embodiments of the present disclosure. The resultant CG of the CGs of the triangles $\Delta_{p4, p8, p12}$, $\Delta_{p4, p12, p16}$ and $\Delta_{p4, p16, p20}$ formed is the CG of the fingertips.

The CGs of all three triangles are given by the following equations:

$$cg1 = \frac{(x_4 + x_8 + x_{12})}{3}, \frac{(y_4 + y_8 + y_{12})}{3}, \frac{(z_4 + z_8 + z_{12})}{3}$$

$$cg2 = \frac{(x_4 + x_{16} + x_{12})}{3}, \frac{(y_4 + y_{16} + y_{12})}{3}, \frac{(z_4 + z_{16} + z_{12})}{3}$$

$$cg3 = \frac{(x_4 + x_{16} + x_{20})}{3}, \frac{(y_4 + y_{16} + y_{20})}{3}, \frac{(z_4 + z_{16} + z_{20})}{3}$$

where $x_n$, $y_n$, $z_n$ is a respective value of x, y and z for a given landmark $p_n$.

The resultant CG from all these CG's is found by creating a triangle using the three CGs (cg1, cg2, cg3). FIG. 8D illustrates the resultant CG from the CGs obtained for the three triangles of FIG. 8C, in accordance with some embodiments of the present disclosure. The resultant center of gravity $cg_R$ is thus given by the following equation:

$$cgR = \frac{(cgR_{1x} + cgR_{2x}, cgR_{3x})}{3},$$

$$\frac{(cgR_{1y} + cgR_{2y}, cgR_{3y})}{3}, \frac{(cgR_{1z} + cgR_{2z}, cgR_{3z})}{3}$$

The FTCGC shows a very minified collective movement of fingertips. This is because it is used to filter out timelines from the GTL.

The palm reference plane is a plane created by the landmarks p0, p5 and p9. FIG. 8E illustrates a palm reference plane, in accordance with some embodiments of the present disclosure. Since the landmarks p5 and p9 do not rotate under normal circumstances compared to a flat fingertips boundary position, p0, p5 and p9 represent the orientation of the palm. The triangular plane formed gives a reliable plane surface for calculations.

In accordance with the present disclosure, the flat fingertips boundary is the surface area between outer landmarks. It covers thumb, little finger, wrist joint and all the fingertips. FIG. 8F illustrates a flat finger boundary, in accordance with some embodiments of the present disclosure. The closed figure created by points p0, p1, p2, p3, p4, p8, p12, p16, p20, p19, p18, and p17 comprises of the flat fingertips boundary. Flat Finger Boundary is a dataset with individual positions for all the 12 landmarks. This boundary is measured when the fingers are at rest, flat and in line with the palm and is recorded before any gestural identification or recording. It helps the CDM filter out non-humanly possible conditions during any frame. The FTCGC for each frame is projected on the palm reference plane to check for non-humanly possible conditions, i.e., the FTCGC should never fall outside the flat fingertip boundary.

In accordance with the present disclosure, the step of combining the results in criterion 3 and criterion 4, via the CDM, comprises checking the FTCGC for humanly possible conditions mentioned above. One condition for checking is that the CG of the fingertips always remains above the palm reference plane. The palm reference plane is calculated at each frame to help calculate the FTCGC. The points p0, p5 and p9 are utilized to construct the palm reference plane. A general equation of a plane is given by: P(x,y,z)=ax+by +cz−d=0→(1)

where a, b, c, and d are constants.

Points p0, p5 and p9 values are put in the equation and the value of a, b, c and d are obtained. Thus, we get the final equation of plane P(x,y,z). FIG. 8G illustrates a projection of the resultant CG of fingertips on the palm reference plane, in accordance with some embodiments of the present disclosure.

The direction vector of the line $L(cgR-cgR_p)$ is given by:

$$N(cgR-cgR_p)=ai+bj+ck, \text{ wherein } N \text{ represents Normal} \rightarrow \quad (2)$$

So, the equation of line perpendicular to the plane P(x,y,z) is given by the below equations:

$$\frac{(x-cgR_x)}{a} = t \Rightarrow x = at + cgR_x \quad (3)$$

$$\frac{(x-cgR_y)}{b} = t \Rightarrow y = bt + cgR_y \quad (4)$$

$$\frac{(x-cgR_z)}{c} = t \Rightarrow z = ct + cgR_y \quad (5)$$

The above values of variables x, y and z are used to satisfy equation (1) and obtain value of t. When the value of t is added to equations (3), (4) and (5) it gives the value of $cgR_p$. The height (y-coordinate, given that y is directed upwards w.r.t the plane) of the point is then calculated with reference to the point $cgR_p$. If the point cgR lies above the plane P(x,y,z) and has a value greater than 0, the gesture is considered as humanly possible.

Further, in accordance with the present disclosure, a second condition for checking the FTCGC for humanly possible conditions is the FTCGC never falls outside a flat fingertips boundary based on a polygon created with a surface normal facing above the palm represented by the landmarks and a perpendicular distance of the FTCGC from the palm reference plane. The point $cgR_p$ calculated above is checked for the bounds. The bounds are checked by comparing the x and z values of $cgR_p$ with the points contributing to the flat fingertips boundary.

The FTCDC is a locus of individual distances covered between two frames represented against the timeline duration. FIG. 8H illustrates a graphical representation of the FTCDC against time, in accordance with some embodiments of the present disclosure. The above figure represents FTCDC visually for all fingertips viz., p0, p4 (thumb tip), p20 (little fingertip), p16 (ring fingertip), p12 (middle fingertip), p8 (index fingertip). The horizontal axis shows timeline and vertical axis shows distance covered in game engine units.

The curves in FIG. 8H show how the finger has moved at which moment. The curves represent velocity of the fingertips for a specific portion. The graph can be used to study the motion of the fingers and a gesture itself. For instance, in FIG. 8H, the major fingertip for time T=x is p16, while at the end of the timeline and hence for the entire gesture, the major fingertip is p8, i.e., the index fingertip.

The Finger Center of Gravity Curve (FCGC) is a derived metric which considers a finger as a point. In this case, the mass of finger is not considered for calculations of the CG. The FCGC simplifies finger movements for any gesture and gives locus of a point representing one finger which is used to filter similar timelines in the GIF. FIG. 8I illustrates a Finger Center of Gravity Curve (FCGC) polygon for an index finger, in accordance with some embodiments of the present disclosure. A closed polygon is formed by the landmarks p5, p6, p7 and p8 on the index finger. To find the CG of this shape, the polygon is subdivided using a line joining the landmarks p5 and p7 thus forming two triangles viz., $\Delta_{p5,p8,p7}$ and $\Delta_{p5,p7,p6}$. FIG. 8J illustrates the subdivided polygon of FIG. 8I, in accordance with some embodiments of the present disclosure. The CG of the closed polygon can be derived by deriving the resultant polygon of the two triangles. The CG of the two triangles is given by:

$$cg1 = \frac{(p5_x + p8_x + p7_x)}{3}, \frac{(p5_y + p8_y + p7_y)}{3}, \frac{(p5_z + p8_z + p7_z)}{3}$$

$$cg2 = \frac{(p5_x + p6_x + p7_x)}{3}, \frac{(p5_y + p6_y + p7_y)}{3}, \frac{(p5_z + p6_z + p7_z)}{3}$$

The resultant CG is obtained by finding the midpoint of $cg_1$ and $cg_2$.

The below equation gives the value of resultant center of gravity cgR:

$$cgR = \frac{(cg1_x + cg2_x)}{2}, \frac{(cg1_y + cg2_y)}{2}, \frac{(cg1_z + cg2_z)}{2}$$

Thus, the FCGC for a particular frame is calculated. FIG. 8K illustrates the FCGC resultant CG for the index finger, in accordance with some embodiments of the present disclosure.

In accordance with the present disclosure, the step of combining the results in criterion 3 and criterion 4 comprises two previous frames are used for interpolation, if there are frames in the generated timeline when the humanly possible conditions are not met. Let a be a frame number at which a non-humanly gesture is found and a−1, a−2 represent two previous frames. For any transform $T_a$, a respective position value is given by the below equations:

$$x_a = x_{(a-1)} + (x_{(a-1)} - x_{(a-2)})$$

$$y_a = y_{(a-1)} + (y_{(a-1)} - y_{(a-2)})$$

$$z_a = z_{(a-1)} + (z_{(a-1)} - z_{(a-2)})$$

Thus, corrected coordinate for transform $T_a = x_a$, $y_a$, $z_a$

In accordance with the present disclosure, the GTL is a library of the previously generated timelines, wherein the timelines are formatted for better speed when transmitting to the GIF for identifying the gesture. The GTL being a huge library, the access time makes a huge impact. New gestures are added to this library as and when needed. Likewise, existing gestures can be deleted and modified.

The GAM is a library that contains mappings of a specific gesture to a specific action, that can be customized based on requirement, while the AAL is a library that contains all possible actions that can be done on a specific augmented digital 3D model. In an embodiment of the present disclosure, the one or more hardware processors 104 are configured to map, at step 312, the identified gesture from step 310 to a user action from an Augmented Action Library (AAL). The identified gesture can be mapped to an existing action or a new action created in the AAL. Furthermore, a new mapping, if created, is stored in the GAM.

Some exemplary actions and gestures include:

Flip phone—Flip visiting card horizontally (180 degrees)

Change color—Thumb swipe when phone's back side is visible.

Change wallpaper—thumb swipe when phone screen is visible.

Open video player—double tap/two finger tap on the card to play or stop while the front side of phone is visible.

Pause/play video (When video is present)—tap on the card to play or pause to simulate tapping on phone's screen so it only works if the phone's screen is visible.

Rotate the card to landscape/portrait mode—Rotate screen/Change orientation (Only when video plays)

Dismiss Video player—swipe down with two fingers to stop

Show offer—wave rapidly/shake card.

Switch camera—Flip the card vertically (180 degrees).

In an embodiment of the present disclosure, the one or more hardware processors 104 are configured to enable, at step 314, the tactile interaction between the physical object and the virtual object, by translating the user action associated with the physical object to the virtual object, based on the mapping and visually represented in the augmentation.

Figure 9:
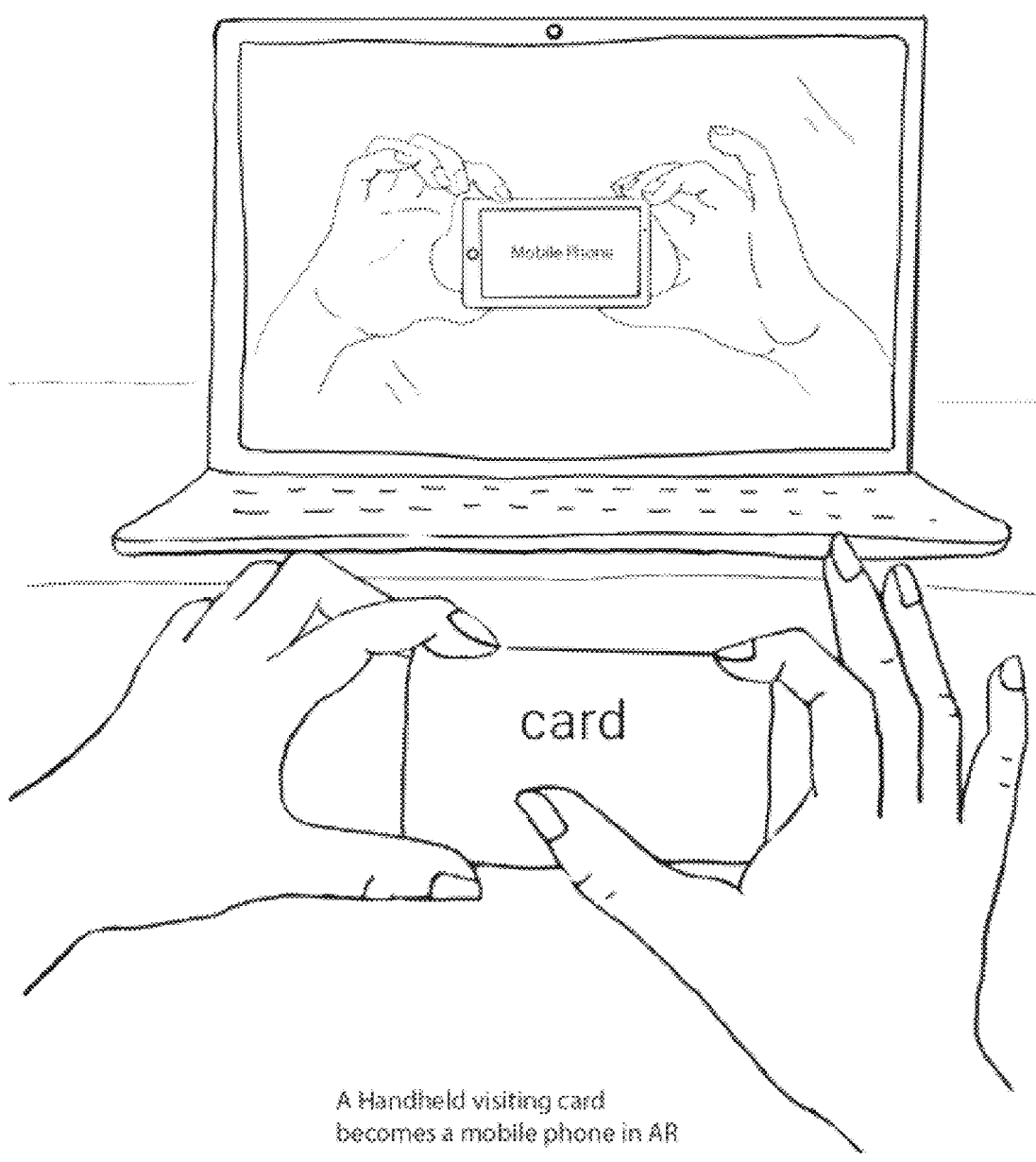
FIG. 9 through FIG. 11 illustrate mapping of a form factor of a physical object to a virtual object, in accordance with some embodiments of the present disclosure.
Figure 10:
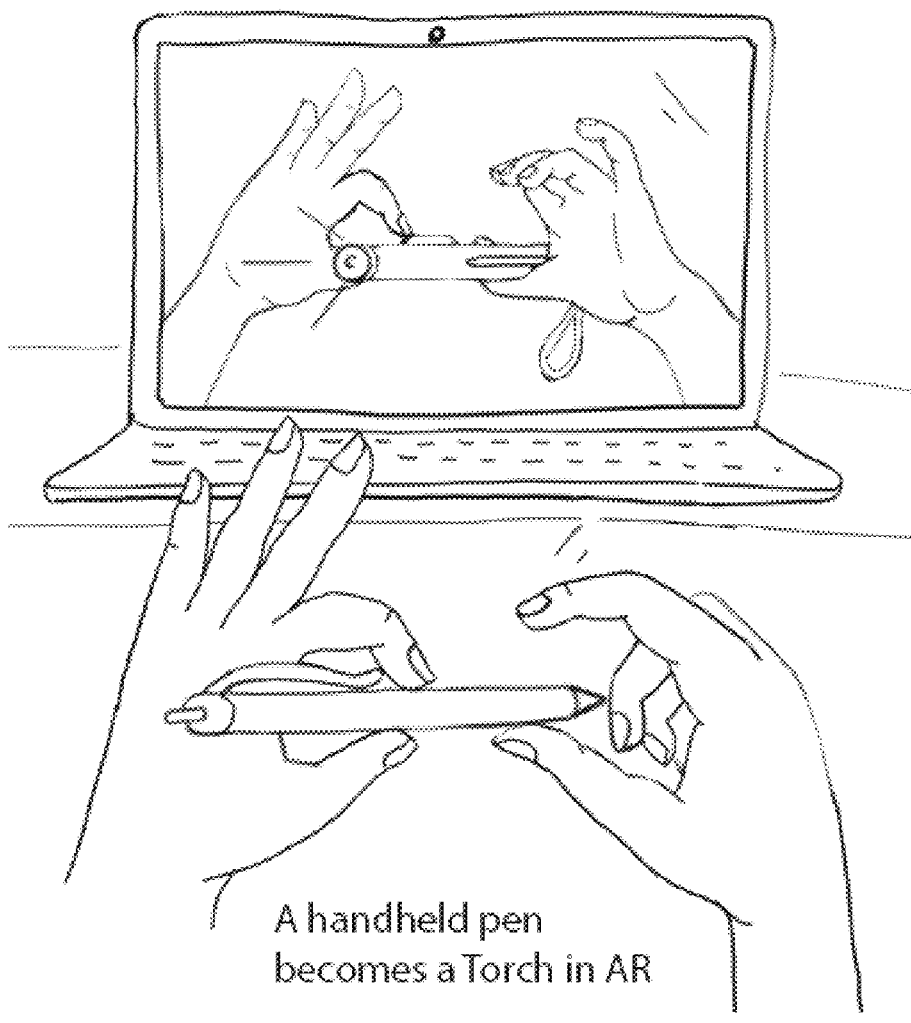
Figure 11:
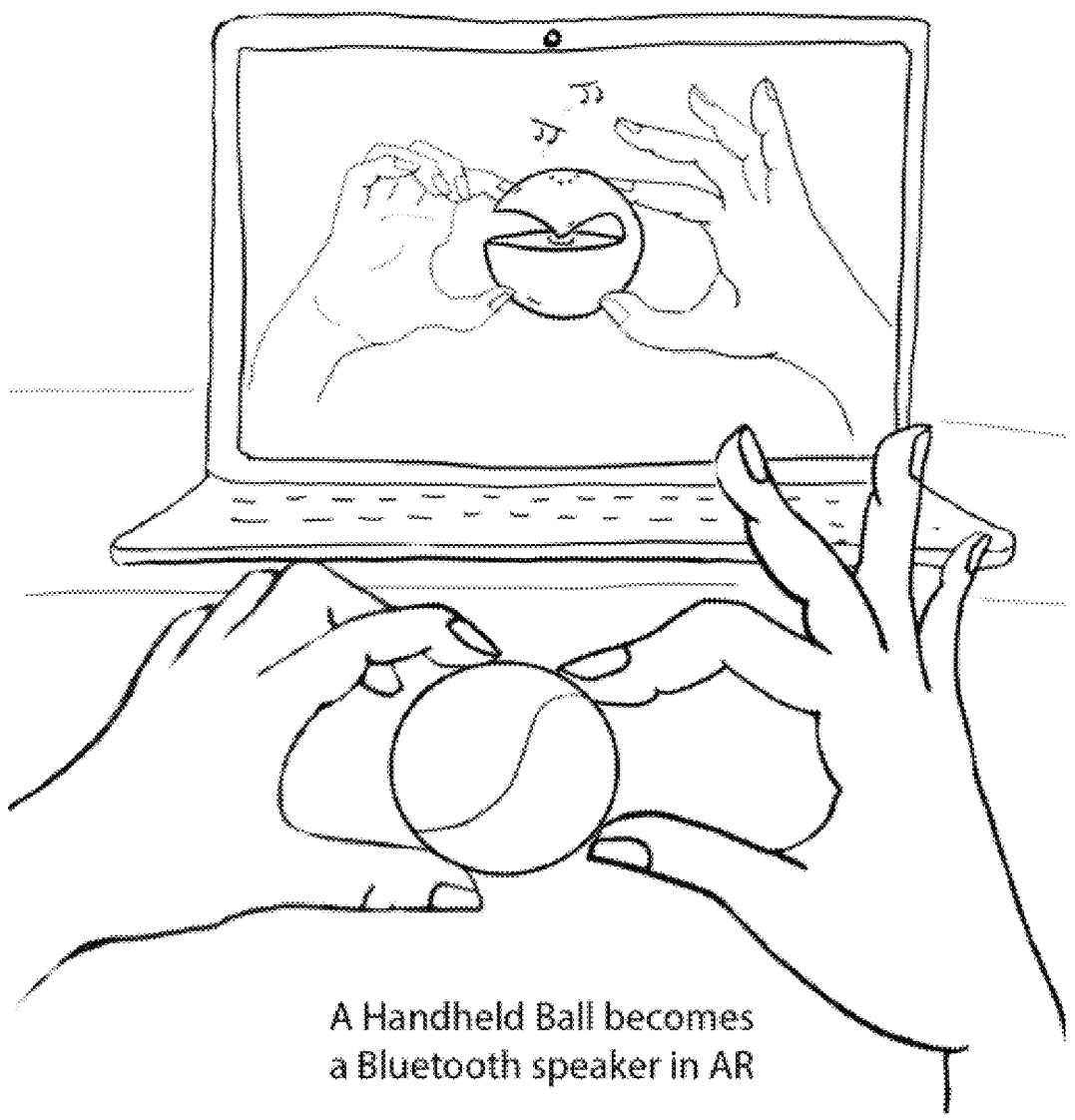

Thus, the method and system of the present disclosure enable an immersive experience via the tactile interaction such that the user experiences the augmentation visually as a direct translation of the actions performed by the user on the hand-held physical object. FIG. 9 through FIG. 11 illustrate mapping of a form factor of a physical object to a virtual object for a tactile interaction therebetween, in accordance with some embodiments of the present disclosure. In FIG. 9, an action on a visiting card is translated onto a virtual object which is a mobile phone in the illustrated use case. In FIG. 10, a handheld pen becomes a torch in AR, such that any action on the handheld pen translates on to the torch (virtual object). Yet another example is illustrated in FIG. 11, wherein a handheld ball represents a Bluetooth™ speaker in AR.

Some use cases, wherein the method and system of the present disclosure find application are described hereinafter through illustrations. FIG. 12A through FIG. 12D illustrate a use case of the method 300 in a Visual Positioning System (VPS)/location-based Augmented Reality (AR) experience, in accordance with some embodiments of the present disclosure. In the illustrated example, a user is present in the physical world near a building shown in FIG. 12A, which has a virtual banner placed on top via an AR cloud. The user opens an AR cloud application which has the virtual banner added. The AR cloud application opens up a back camera of the user's phone (system of the present disclosure). As the user gazes at the building top using the AR cloud application, the user sees the virtual banner appear on top of the building as seen in FIG. 12B. The user receives a prompt and holds up a pencil in front of the back camera, after the augmentation occurs as seen in FIG. 12C. The system of the present disclosure now enables gestural control. As the user rotates the pencil clockwise by some angle, the banner also rotates by the same angle in a clockwise direction. The system provides a physical handle to the user to control the rotation of the banner using a physical object which in this case is a pencil. In this AR experience, the physical object serves only as the controller.

Figure 13E:
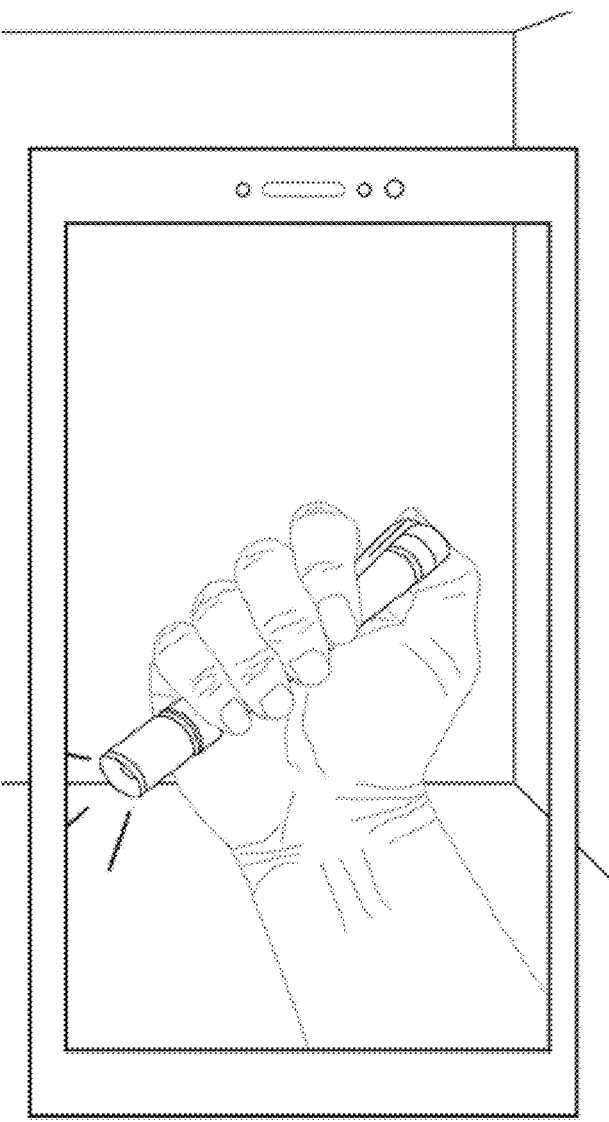

FIG. 13A through FIG. 13E illustrate a use case of the method 300 in an Object Detection and superimposition experience, in accordance with some embodiments of the present disclosure. FIG. 13A shows a pen torch that a user is interested in buying from an online store. The user initiates an AR experience by clicking on 'View in AR' button in this example. The back camera of the users phone (system of the present disclosure) opens up and the user in this example is prompted to hold up a cylindrical object in front of the back camera as shown in FIG. 13B. The user holds up a click pen and shows it to the phone's back camera as seen in FIG. 13C. The system of the present disclosure recognizes the click pen as a cylindrical object. A 3D model of the pen torch (virtual object) is superimposed on top of the pen. This gives the user a feeling of holding the product virtually as seen in FIG. 13D. In the FIG. 13D, the pen torch has been given transparency to represent the superimposition for ease in explanation. In an actual scenario, the 3D model of the pen torch is opaque. As the user clicks the top of the handheld pen, the pen torch lights up, giving the user a tactile experience of the product and facilitates controlling the virtual object (pen torch) via a physical object (click pen) held in the user's hand as seen in FIG. 13E. In this AR experience, the physical object serves both as the marker and the controller and the matching form factor makes the AR experience immersive for the user.

Figures 14C, 14D:
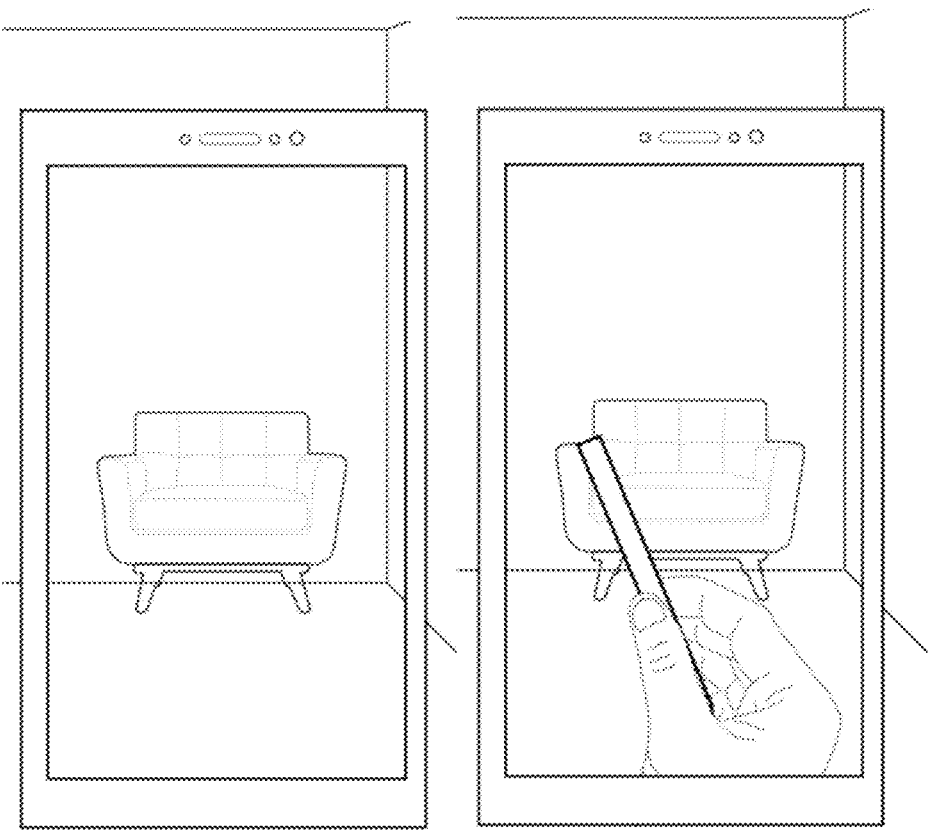
Figure 14E:
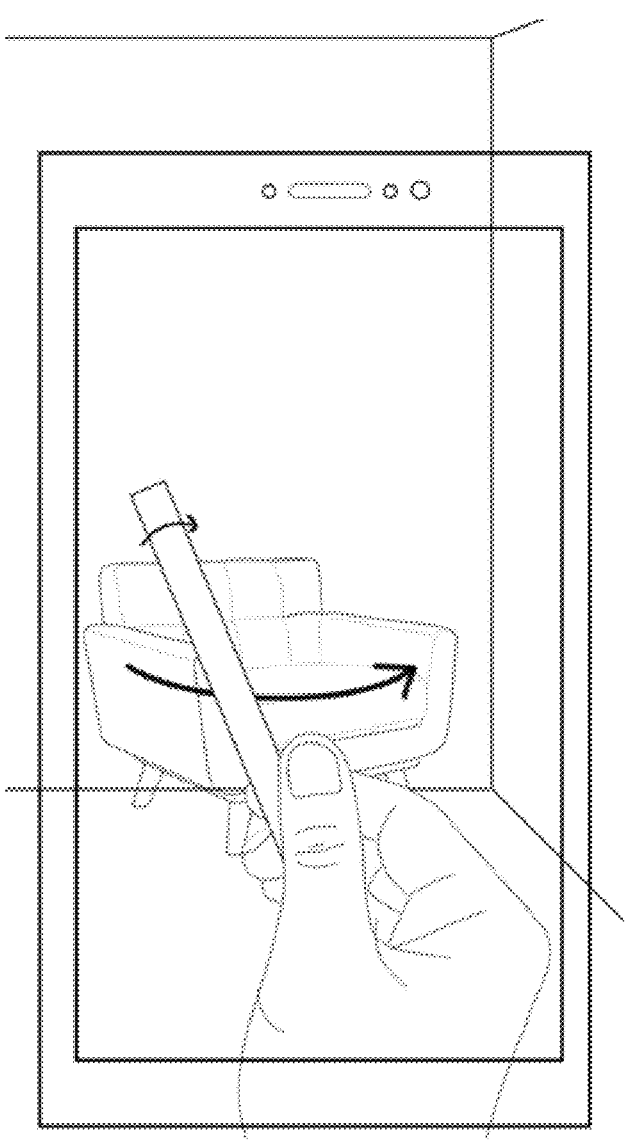

FIG. 14A through FIG. 14E illustrate a use case of the method 300 in a markerless AR experience, in accordance with some embodiments of the present disclosure. A user is interested in buying a furniture (sofa) from an online store as seen in FIG. 14A. The user finds clicks on 'View in AR' button to initiate the markerless AR experience in this example. The system prompts the user to use his phone (system of the present disclosure) to scan any flat surface for surface detection to happen as seen in FIG. 14B. As soon as the surface is detected, the sofa is augmented in the user's space or environment as seen in FIG. 14C. The user then in response to a prompt by the system, holds up a pencil (cylindrical object) in front of the phone's back camera to control the augmented 3D model of the sofa as seen in FIG. 14D. As the user rotates the pencil clockwise by some angle, the sofa also rotates by the same angle in a clockwise direction as seen in FIG. 14E. The system provides the user a physical handle to control the rotation of the sofa using a physical object which in this case is a pencil. In the markerless AR experience, the physical object serves only as the controller.

In accordance with the present disclosure, the step of initiating a request for an Extended Reality (XR) viewing of a virtual object is preceded by pre-processing a plurality of 3D models of objects available on an XR viewing enabled platform, to generate a list of physical objects having a size comparable with a user's hand based on an associated form factor, to make the tactile interaction of the physical object with the virtual object an immersive experience. Some examples of physical objects having a size comparable with a user's hand include a computer mouse, pen, visiting card, juice box and soda can. The list of physical objects that is output by the pre-processing step are most suitable for marker-based, and object detection and superimposition XR experiences. The output of the pre-processing step can be used for the VPS/location-based AR and markerless AR but the transforms would be very abrupt as the physical object in hand needs to always be compact enough to be held in one or two hands. This causes a problem for bigger sized objects where every transform on a hand-held physical object is amplified to a bigger size 3D model augmented in AR. This may cause discomfort to users as they may not be able to fine tune the transforms on a digital 3D model using an 'n' times smaller physical object in hand. Hence, in accordance with the present disclosure, a smaller object is prompted for use to obtain a fine-tuned motion. For instance, a pen which when rolled between fingers rotates a 3D model of a billboard (also refer description related to FIG. 12A-FIG. 12D below) as if the user is holding the billboard.

The step of pre-processing happens when either a new 3D model is added to an XR platform for a specific product (e.g.

a chair) or if there is already a list of products in an XR database i.e. product Stock-Keeping Unit (SKU).

In an embodiment, the step of pre-processing comprises creating an orthographic alpha map data for all six orthographic views of each 3D model in the plurality of 3D models using a 3D engine. Each 3D model is loaded into the 3D engine using a respective loading library. For different file formats, different loading libraries are used. For instance, to load an fbx file in threeJS, a library called FBXLoader needs to be used. It is ensured that the model is not rotated at any angle on any axes.

Once loaded, the object is resized proportionally by a Tolerance factor explained hereinafter. If $S_x$, $S_y$, and $S_z$ denote the sizes of the 3D model along the three axes, a maximum value ($S_m$) among all three values, is used to resize the model by adding a Tolerance factor. In an embodiment, the Tolerance=$S_m$/10. Tolerance ensures that the largest size of the model's sides is under the bounding limits when ray casting is done. This prevents the model going out of bounds from a scanning area. The model is then down-scaled using the maximum value to fit within 1 unit of a 3D space.

A ray caster is used to scan the 3D model from six different orthographic views. The ray caster uses the limits (1 unit from origin for all axes) to position and orient itself and to create a planar mapping for all six views. The scanning resolution is 100. The total scanning points for one orthographic view is 100*100 (10000 points). When this data is translated into an image it results in an image with 100 px width and 100 px height. The total size of scanning volume is 8 Units Square. (Unit is 1 unit in the 3D engine). When the mapping is done for six views viz., front, back, top, bottom, left, right, the respective data is stored in RGBA format (image pixel data) in a Uint8ClampedArray with a length of 40000 (4*resolution*resolution) claiming 4 elements in the array for each pixel. Uint8ClampedArray can only take clamped integer values from 0 to 255. The values for each pixel are (255, 255, 255, 255) or (0,0,0,255) representing whether the ray caster intersected with object or not respectively.

If the ray intersects the 3D model, it is considered as one pixel data and the value is set to (255, 255, 255, 255) for four consecutive array elements, otherwise (0,0,0,255). To keep the process light and fast, 100 ray castings are done in a row and the process is repeated for 100 columns. Although more divisions such as 500×500 gives more precision, the speed reduces drastically. The positioning of the ray caster is done by dividing 2 units distance into 100 portions and moving the ray caster accordingly between the bounds of [−1 to 1] for all three axes. The total number of ray castings thus formed are 100×100 for each orthographic projection.

The created orthographic alpha map data is converted into six alpha maps as image files. Shapes present in each of the six alpha maps are classified using a Machine Learning (ML) classifier based on an associated confidence value. The output is an array of shapes found in all six orthographic alpha maps. The classified shapes are converted into corresponding 3D forms. Finally, the 3D forms are mapped to physical objects having matching form factors to generate the list (string) of physical objects.

In accordance with an embodiment of the present disclosure, the step 304 of prompting a user to hold a physical object in the camera's view and perform a gesture comprises prompting the user to hold one or more physical objects from the generated list of physical objects as explained above. For instance, for an XR viewing of a mobile phone, the user may be prompted to hold a visiting card (Refer FIG. 9).

In another embodiment of the present disclosure, the user may scan the environment around, wherein the system receives a continuous video feed from the camera. One or more physical objects in the user's environment that belong to the generated list of physical objects as explained above is identified using an object detection SDK. The user is then prompted to hold one of the identified one or more physical objects.

In accordance with the present disclosure, affordance match is an important consideration when identifying a physical object to be used as a marker, wherein the affordance match is a quality or property of an object that determines its possible uses or makes clear how it can be used. For instance, a sphere can be rolled or spin, but it cannot be flipped. A visiting card could be an augmented mobile device since the form factors are similar.

Thus, in accordance with the present disclosure, an immersive experience is provided to the user engaging on an XR platform in the form of a better control of the augmentation resulting in a deeper connect with the product (virtual object). The product is experienced remotely through not only sight but also touch manipulation, thereby improving an engagement with the product. The method and system of the present disclosure find practical application in healthcare and life sciences, retail or ecommerce, manufacturing, education, automobile domain and the like with some use cases as described above.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising the steps of:

initiating, via a system in communication with a camera and an Extended Reality (XR) setup, a request for an XR viewing of a virtual object using (i) a marker-based approach, wherein the XR setup comprises a corresponding software development kit (SDK) or (ii) a markerless or a location-based approach, wherein the XR setup comprises the corresponding SDK and an object detection SDK;

prompting a user, via one or more hardware processors comprised in the system, in response to the request, to hold a physical object in the camera's view and perform a gesture, wherein the physical object having an associated form factor serves as at least one of (i) a marker, and (ii) a controller, coupled to the virtual object for tactile interaction there between;

24 obtaining, via the one or more hardware processors, (i) a collective transform data based on generated transform data and (ii) an augmentation from the XR setup using either (a) the marker coupled to the virtual object, (b) by scanning a user's environment by the camera or (c) turning on the camera, wherein the transform data is generated in the form of a position, an orientation and a scale associated with (i) the physical object and (ii) at least one hand of the user handling the physical object, from a continuous video feed from the camera, and when the user performs the prompted gesture;

recording, via the one or more hardware processors, values of the collective transform data based on at least one start recording criterion and at least one stop recording criterion being met, to generate a timeline of collective transform data, wherein recording values of the collective transform data further comprises deriving metrics including:

(i) FingerTips Covered Distance (FTCD) being a distance covered throughout the gesture by each individual fingertip of the at least one hand, (ii) FingerTips Covered Distance Curve (FTCDC) being an array of Float32Array containing distance covered by each fingertip of the at least one hand per frame throughout the gesture, (iii) major fingertips being fingertips of the at least one hand that are actively associated with the performed gesture and characterized by FTCD being at least 50% of the largest FTCD, (iv) FingerTips Center of Gravity Curve (FTCGC) being an array comprising Center of Gravity (CG) of a closed shape created by connecting the positions of landmarks of each fingertip of the at least one hand, (v) Finger Center of Gravity Curve (FCGC) being a Float32Array comprising center of gravity for individual fingers in each frame, and (vi) identification of the at least one hand of the user being a left hand, a right hand or both;

identifying, via the one or more hardware processors, a gesture corresponding to the generated timeline for interacting with the virtual object;

prompting a user, via one or more hardware processors comprised in the system, in response to a cumulation request generated when the at least one stop recording criterion is met, receiving a last portion of the recorded collective transform data and combining the computed 2D array of results to obtain a 1-dimensional (1D) array of results corresponding to the generated timeline; and identifying a result from the 1D array of results that corresponds to the gesture for interacting with the virtual object based on a selection criterion from a plurality of selection criteria;

mapping, via the one or more hardware processors, the identified gesture to a user action from an Augmented Action Library (AAL); and enabling, via the one or more hardware processors, the tactile interaction between the physical object and the virtual object, by translating the user action associated with the physical object to the virtual object, based on the mapping and visually represented in the augmentation.

2. The processor implemented method of claim 1, wherein the at least one start recording criterion comprises: (i) change in an orientation of the physical object by at least an empirically determined angle in at least one axis, (ii) the physical object or positions of landmarks of at least one hand move by an empirically determined absolute distance represented in Normalized Device Coordinates (NDC) space, and (iii) a change in scale of the physical object by at least an empirically determined value; and the at least one stop recording criterion comprises: (i) the at least one hand or the physical object does not move for an empirically determined time duration, (ii) the recording exceeds an empirically determined recording time, and (iii) the at least one hand or the physical object is not visible to the camera.

3. The processor implemented method of claim 2, wherein the empirically determined angle is 30 degrees, the empirically determined absolute distance is 0.1 unit, the empirically determined value is 0.25, the empirically determined time duration is 1 second, and the empirically determined recording time is 5 seconds.

4. The processor implemented method of claim 1, where the step of identifying a gesture corresponding to the generated timeline comprises:

periodically receiving a portion of the recorded collective transform data during the step of generating the timeline;

filtering previously generated timelines in a Gesture Transform Library (GTL) by comparing each portion received periodically with identical portions thereof, based on (i) a form factor of the physical object, (ii) identification of the at least one hand used being the left hand, the right hand or both, (iii) the major fingertips, (iv) 3D curve of the FCGC using curve matching, (v) 3D curve of the FTCDC using curve matching, and (vi) 3D curve of the FTCGC using curve matching;

creating 3D curves associated with (i) the periodically received portions, using the transform data associated with landmarks of fingertips of the used at least one hand and the transform data of the physical object and (ii) the filtered timelines in the GTL using curve matching;

computing, a 2-dimensional (2D) array of results, based on an associated confidence level generated after comparing the created 3D curves, wherein a first dimension corresponds to each of the received portions and a second dimension is an array of associated results;

in response to a cumulation request generated when the at least one stop recording criterion is met, receiving a last portion of the recorded collective transform data and combining the computed 2D array of results to obtain a 1-dimensional (1D) array of results corresponding to the generated timeline; and identifying a result from the 1D array of results that corresponds to the gesture for interacting with the virtual object based on a selection criterion from a plurality of selection criteria.

5. The processor implemented method of claim 4, wherein the plurality of selection criteria comprises:

criterion 1 pertaining to the number of results in the 1D array, wherein (i) if the 1D array is empty, then adding a new gesture corresponding to the generated timeline to the GTL; (ii) if the 1D array has one result, then the result corresponds to the gesture for interacting with the virtual object; and (iii) if the 1D array has more than one result, selecting a result based on an associated confidence value and a recorded length;

criterion 2 pertaining to a difference between confidence values, wherein confidence values of results in the 1D array are compared with a result having a highest confidence value; the results in the 1D array having a difference in confidence values greater than a pre-defined value are eliminated and criterion 1 pertaining to the number of results in the 1D array is executed on the remaining results in the 1D array, while the results in the 1D array having a difference in the confidence values less than the predefined value are checked with reference to associated recorded length;

criterion 3 pertaining to a check for multiple gestures, wherein if the associated recorded lengths are equal for all the results, combining the results to form a new gesture and adding to the GTL; and if the recorded length of at least one result is unequal when compared to the remaining results in the 1D array, executing a criterion 4; and criterion 4 pertaining to recorded length of the generated timeline, wherein the results having a matching recorded length with the generated timeline are combined to form a new gesture and adding to the GTL, while the remaining results in the 1D array are eliminated; and if the recorded length of no result matches with that of the generated timeline, a new gesture is added to the GTL.

6. The processor implemented method of claim 5, wherein the step of combining the results in criterion 3 and criterion 4 comprises:

obtaining the CG for the landmarks of the used at least one hand and objection detection using the associated transform data at each frame in the generated timeline, wherein the obtained CG serves as a new transform data;

checking the FTCGC for humanly possible conditions including (i) the CG of the fingertips always remains above a palm reference plane, and (ii) the FTCGC never falls outside a flat fingertips boundary based on a polygon created with a surface normal facing above the palm represented by the landmarks and a perpendicular distance of the FTCGC from the palm reference plane;

recalculating the transform data using linear interpolation by considering two previous frames, if there are frames in the generated timeline when the humanly possible conditions are not met; and computing the FTCD, the FTCDC, the major fingertips, the FCGC and the FTCGC corresponding to a new gesture, using the recalculated transform data; and adding the new gesture to the GTL.

7. The processor implemented method of claim 6, wherein the step of mapping the identified gesture to a user action from an AAL comprises one or more of (i) mapping the identified gesture to an existing action or a new action created in the AAL; and (ii) storing a new mapping in a Gesture to Action Mapping (GAM) Library.

8. The processor implemented method of claim 1, wherein the step of initiating a request for an Extended Reality (XR) viewing of a virtual object is preceded by pre-processing a plurality of 3D models of objects available on an XR viewing enabled platform, to generate a list of physical objects having a size comparable with a user's hand based on an associated form factor, and wherein the step of pre-processing comprises:

creating an orthographic alpha map data for all six orthographic views of each 3D model in the plurality of 3D models using a 3D engine;

converting the created orthographic alpha map data into six alpha maps as image files;

classifying, shapes present in each of the six alpha maps using a Machine Learning (ML) classifier based on an associated confidence value;

converting the classified shapes into corresponding 3D forms; and mapping the 3D forms to physical objects having matching form factors to generate the list of physical objects.

9. The processor implemented method of claim 8, wherein the step of prompting a user, to hold a physical object in the camera's view and perform a gesture comprises one of:
    (i) prompting the user to hold one of one or more physical objects from the generated list of physical objects; or
    (ii) receiving a continuous video feed from the camera; identifying one or more physical objects in the user's environment comprised in the generated list of physical objects using an object detection SDK; and prompting the user to hold one of the identified one or more physical objects.

10. The processor implemented method of claim 9, wherein the form factor of the physical object matches the form factor of the virtual object to make the tactile interaction an immersive experience.

11. A system comprising:
    a memory storing instructions;
    one or more communication interfaces; and
    one or more hardware processors coupled to the memory via the one or more communication interfaces, wherein the one or more hardware processors are configured by the instructions to:
    initiate a request for an Extended Reality (XR) viewing of a virtual object via a camera and an XR setup by using (i) a marker-based approach, wherein the XR setup comprises a corresponding software development kit (SDK) or (ii) a markerless or a location-based approach, and wherein the XR setup comprises the corresponding SDK and an object detection SDK;
    prompt a user, in response to the request, to hold a physical object in the camera's view and perform a gesture, wherein the physical object having an associated form factor serves as at least one of (i) a marker, and (ii) a controller, coupled to the virtual object for tactile interaction therebetween;
    obtain (i) a collective transform data based on generated transform data and (ii) an augmentation from the XR setup using either (a) the marker coupled to the virtual object, (b) by scanning a user's environment by the camera or (c) turning on the camera, wherein the transform data is generated in the form of a position, an orientation and a scale associated with (i) the physical object and (ii) at least one hand of the user handling the physical object, from a continuous video feed from the camera, and when the user performs the prompted gesture;
    record values of the collective transform data based on at least one start recording criterion and at least one stop recording criterion being met, to generate a timeline of collective transform data, wherein recording values of the collective transform data further comprises deriving metrics including:
        (i) FingerTips Covered Distance (FTCD) being a distance covered throughout the gesture by each individual fingertip of the at least one hand,
        (ii) FingerTips Covered Distance Curve (FTCDC) being an array of Float32Array containing distance covered by each fingertip of the at least one hand per frame throughout the gesture,
        (iii) major fingertips being fingertips of the at least one hand that are actively associated with the performed gesture and characterized by FTCD being at least 50% of the largest FTCD,
        (iv) FingerTips Center of Gravity Curve (FTCGC) being an array comprising Center of Gravity (CG) of a closed shape created by connecting the positions of landmarks of each fingertip of the at least one hand,
        (v) Finger Center of Gravity Curve (FCGC) being a Float32Array comprising center of gravity for individual fingers in each frame, and
        (vi) identification of the at least one hand of the user being a left hand, a right hand or both;
    identify, a gesture corresponding to the generated timeline for interacting with the virtual object;
    map, the identified gesture to a user action from an Augmented Action Library (AAL) by one or more of (i) mapping the identified gesture to an existing action or a new action created in the AAL; and (ii) storing a new mapping in a Gesture to Action Mapping (GAM) Library; and
    enable, the tactile interaction between the physical object and the virtual object, by translating the user action associated with the physical object to the virtual object, based on the mapping and visually represented in the augmentation.

12. The system of claim 11, wherein the at least one start recording criterion comprises: (i) change in an orientation of the physical object by at least an empirically determined angle in at least one axis, (ii) the physical object or positions of landmarks of at least one hand move by an empirically determined absolute distance represented in Normalized Device Coordinates (NDC) space, and (iii) a change in scale of the physical object by at least an empirically determined value; and the at least one stop recording criterion comprises: (i) the at least one hand or the physical object does not move for an empirically determined time duration, (ii) the recording exceeds an empirically determined recording time, and (iii) the at least one hand or the physical object is not visible to the camera.

13. The system of claim 12, wherein the empirically determined angle is 30 degrees, the empirically determined absolute distance is 0.1 unit, the empirically determined value is 0.25, the empirically determined time duration is 1 second, and the empirically determined recording time is 5 seconds.

14. The system of claim 11, wherein the one or more processors are configured by the instructions to identify a gesture corresponding to the generated timeline by:
    periodically receiving a portion of the recorded collective transform data during the step of generating the timeline;
    filtering previously generated timelines in a Gesture Transform Library (GTL) by comparing each portion received periodically with identical portions thereof, based on (i) form factor of the physical object, (ii) identification of the at least one hand used being the left hand, the right hand or both, (iii) the major fingertips, (iv) 3D curve of the FCGC using curve matching, (v) 3D curve of the FTCDC using curve matching, and (vi) 3D curve of the FTCGC using curve matching;
    creating 3D curves associated with (i) the periodically received portions, using the transform data associated with landmarks of fingertips of the used at least one hand and the transform data of the physical object and (ii) the filtered timelines in the GTL using curve matching;
    computing, a 2-dimensional (2D) array of results, based on an associated confidence level generated after comparing the created 3D curves, wherein a first dimension corresponds to each of the received portions and a second dimension is an array of associated results;

in response to a cumulation request generated when the at least one stop recording criterion is met, receiving a last portion of the recorded collective transform data and combining the computed 2D array of results to obtain a 1-dimensional (1D) array of results corresponding to the generated timeline; and identifying a result from the 1D array of results that corresponds to the gesture for interacting with the virtual object based on a selection criterion from a plurality of selection criteria.

15. The system of claim 14, wherein the plurality of selection criteria comprises:

criterion 1 pertaining to the number of results in the 1D array, wherein (i) if the 1D array is empty, then adding a new gesture corresponding to the generated timeline to the GTL; (ii) if the 1D array has one result, then the result corresponds to the gesture for interacting with the virtual object; and (iii) if the 1D array has more than one result, selecting a result based on an associated confidence value and a recorded length;

criterion 2 pertaining to a difference between confidence values of results, wherein confidence values of results in the 1D array are compared with a result having a highest confidence value; the results in the 1D array having a difference in confidence values greater than a predefined value are eliminated and criterion 1 pertaining to the number of results in the 1D array is executed on the remaining results in the 1D array, while the results in the 1D array having a difference in the confidence values less than the predefined value are checked with reference to associated recorded length;

criterion 3 pertaining to a check for multiple gestures, wherein if the associated recorded lengths are equal for all the results, combining the results to form a new gesture and adding to the GTL; and if the recorded length of at least one result is unequal when compared to the remaining results in the 1D array, executing a criterion 4; and criterion 4 pertaining to recorded length of the generated timeline, wherein the results having a matching recorded length with the generated timeline are combined to form a new gesture and adding to the GTL, while the remaining results in the 1D array are eliminated; and if the recorded length of no result matches with that of the generated timeline, a new gesture is added to the GTL.

16. The system of claim 15, wherein the one or more processors are configured by the instructions to combine the results in criterion 3 and criterion 4 by:

obtaining the CG for the landmarks of the used at least one hand and objection detection using the associated transform data at each frame in the generated timeline, wherein the obtained CG serves as a new transform data;

checking the FTCGC for humanly possible conditions including (i) the CG of the fingertips always remains above a palm reference plane, and (ii) the FTCGC never falls outside a flat fingertips boundary based on a polygon created with a surface normal facing above the palm represented by the landmarks and a perpendicular distance of the FTCGC from the palm reference plane;

recalculating the transform data using linear interpolation by considering two previous frames, if there are frames in the generated timeline when the humanly possible conditions are not met; and computing the FTCD, the FTCDC, the major fingertips, the FCGC and the FTCGC corresponding to a new gesture, using the recalculated transform data; and adding the new gesture to the GTL.

17. The system of claim 11, wherein the one or more processors are further configured by the instructions to perform, prior to initiating the request for the XR viewing, pre-processing of a plurality of 3D models of objects available on an XR viewing enabled platform, to generate a list of physical objects having a size comparable with a user's hand based on an associated form factor, wherein the pre-processing comprises:

creating an orthographic alpha map data for all six orthographic views of each 3D model in the plurality of 3D models using a 3D engine;

converting the created orthographic alpha map data into six alpha maps as image files;

classifying, shapes present in each of the six alpha maps using a Machine Learning (ML) classifier based on an associated confidence value;

converting the classified shapes into corresponding 3D forms; and mapping the 3D forms to physical objects having matching form factors to generate the list of physical objects.

18. One or more non-transitory machine-readable information storage mediums comprising one or more instructions which when executed by one or more hardware processors cause:

initiating, via a system in communication with a camera and an Extended Reality (XR) setup, a request for an XR viewing of a virtual object using (i) a marker-based approach, wherein the XR setup comprises a corresponding software development kit (SDK) or (ii) a markerless or a location-based approach, wherein the XR setup comprises the corresponding SDK and an object detection SDK;

prompting a user, in response to the request, to hold a physical object in the camera's view and perform a gesture, wherein the physical object having an associated form factor serves as at least one of (i) a marker, and (ii) a controller, coupled to the virtual object for tactile interaction therebetween;

obtaining (i) a collective transform data based on generated transform data and (ii) an augmentation from the XR setup using either (a) the marker coupled to the virtual object, (b) by scanning a user's environment by the camera or (c) turning on the camera, wherein the transform data is generated in the form of a position, an orientation and a scale associated with (i) the physical object and (ii) at least one hand of the user handling the physical object, from a continuous video feed from the camera, and when the user performs the prompted gesture;

recording values of the collective transform data based on at least one start recording criterion and at least one stop recording criterion being met, to generate a timeline of collective transform data, wherein recording values of the collective transform data further comprises deriving metrics including:

(i) FingerTips Covered Distance (FTCD) being a distance covered throughout the gesture by each individual fingertip of the at least one hand, (ii) FingerTips Covered Distance Curve (FTCDC) being an array of Float32Array containing distance covered by each fingertip of the at least one hand per frame throughout the gesture, (iii) major fingertips being fingertips of the at least one hand that are actively associated with the performed gesture and characterized by FTCD being at least 50% of the largest FTCD, (iv) FingerTips Center of Gravity Curve (FTCGC) being an array comprising Center of Gravity (CG) of a closed shape created by connecting the positions of landmarks of each fingertip of the at least one hand, (v) Finger Center of Gravity Curve (FCGC) being a Float32Array comprising center of gravity for individual fingers in each frame, and (vi) identification of the at least one hand of the user being a left hand, a right hand or both;

identifying, via the one or more hardware processors, a gesture corresponding to the generated timeline for interacting with the virtual object;

mapping the identified gesture to a user action from an Augmented Action Library (AAL); and enabling the tactile interaction between the physical object and the virtual object, by translating the user action associated with the physical object to the virtual object, based on the mapping and visually represented in the augmentation.

\*   \*   \*   \*   \*